(12) United States Patent
Lutz et al.

(10) Patent No.: US 12,164,881 B2
(45) Date of Patent: Dec. 10, 2024

(54) TININESS DETECTION

(71) Applicant: Arm Limited, Cambridge (GB)

(72) Inventors: David Raymond Lutz, Austin, TX (US); David M. Russinoff, Austin, TX (US); Harsha Valsaraju, Austin, TX (US)

(73) Assignee: Arm Limited, Cambridge (GB)

( * ) Notice: Subject to any disclaimer, the term of this patent is extended or adjusted under 35 U.S.C. 154(b) by 453 days.

(21) Appl. No.: 17/384,001

(22) Filed: Jul. 23, 2021

(65) Prior Publication Data

US 2023/0035159 A1 Feb. 2, 2023

(51) Int. Cl.
| | |
|---|---|
| *G06F 7/483* | (2006.01) |
| *G06F 5/01* | (2006.01) |
| *G06F 7/10* | (2006.01) |
| *G06F 7/499* | (2006.01) |

(52) U.S. Cl.
CPC .............. *G06F 7/483* (2013.01); *G06F 5/012* (2013.01); *G06F 7/10* (2013.01); *G06F 7/49947* (2013.01)

(58) Field of Classification Search
CPC ...................................................... G06F 5/012
See application file for complete search history.

(56) References Cited

U.S. PATENT DOCUMENTS

| | | | | |
|---|---|---|---|---|
| 2004/0254970 | A1* | 12/2004 | Driker ................ | G06F 7/49936 708/495 |
| 2016/0092167 | A1* | 3/2016 | Rarick ............... | G06F 7/49957 708/497 |
| 2017/0060533 | A1* | 3/2017 | Ahmed ................ | G06F 7/4991 |
| 2017/0090868 | A1* | 3/2017 | Lutz ....................... | G06F 5/012 |

OTHER PUBLICATIONS

N.a., "FPGA Basics: Architecture, Applications and Uses," Arrow Electronics, Sep. 24, 2018. Retrieved from Wayback Machine Snapshot on Jul. 26, 2020. (Year: 2020).*

* cited by examiner

*Primary Examiner* — Andrew Caldwell
*Assistant Examiner* — Vivian Diem Ha Ledynh
(74) *Attorney, Agent, or Firm* — NIXON & VANDERHYE P.C.

(57) ABSTRACT

An apparatus comprises floating-point processing circuitry to perform a floating-point operation with rounding to generate a floating-point result value; and tininess detection circuitry to detect a tininess status indicating whether an outcome of the floating-point operation is tiny. A tiny outcome corresponds to a non-zero number with a magnitude smaller than a minimum non-zero magnitude representable as a normal floating-point number in a floating-point format to be used for the floating-point result value. The tininess detection circuitry comprises hardware circuit logic configured to support both before rounding tininess detection and after rounding tininess detection for detecting the tininess status.

19 Claims, 7 Drawing Sheets

TININESS DETECTION

BACKGROUND

Technical Field

The present technique relates to the field of data processing. More particularly, it relates to tininess detection for floating-point operations.

Technical Background

A data processing apparatus may provide support for processing numbers represented in floating-point representation. In a floating-point representation, a number is represented using a significand 1.F or 0.F, an exponent E and a sign bit S. The sign bit S represents whether the floating-point number is positive or negative. The significand 1.F or 0.F represents the significant digits of the floating-point number (with an implicit bit of 1 or 0 for normal and subnormal values respectively, and F denoting the stored bits of the floating-point number which indicate remaining bits of the significand after the implicit bit of 1 or 0). For normal numbers, the exponent E represents the position of a radix point (also known as a binary point) relative to the significand. Hence, by varying the value of the exponent, the radix point can float left and right within the significand, so that for a predetermined number of bits, a floating-point representation can represent a wider range of numbers than a fixed-point representation for which the radix point has a fixed location within the significand.

SUMMARY

At least some examples provide an apparatus comprising: floating-point processing circuitry to perform a floating-point operation with rounding to generate a floating-point result value; and tininess detection circuitry to detect a tininess status indicating whether an outcome of the floating-point operation is tiny, where a tiny outcome corresponds to a non-zero number with a magnitude smaller than a minimum non-zero magnitude representable as a normal floating-point number in a floating-point format to be used for the floating-point result value; the tininess detection circuitry comprising hardware circuit logic configured to support both before rounding tininess detection and after rounding tininess detection for detecting the tininess status.

At least some examples provide a data processing method comprising: performing a floating-point operation with rounding to generate a floating-point result value; and detecting a tininess status indicating whether an outcome of the floating-point operation is tiny, where a tiny outcome corresponds to a non-zero number with a magnitude smaller than a minimum non-zero magnitude representable as a normal floating-point number in a floating-point format to be used for the floating-point result value; in which: the tininess status is detected using tininess detection circuitry comprising hardware circuit logic configured to support both before rounding tininess detection and after rounding tininess detection for detecting the tininess status.

At least some examples provide an apparatus comprising: floating-point processing circuitry to perform a floating-point operation with injection rounding to generate an injection-rounded significand for a floating-point result value; and tininess detection circuitry to detect a tininess status indicating whether an outcome of the floating-point operation is tiny, where a tiny outcome corresponds to a non-zero number with a magnitude smaller than a minimum non-zero magnitude representable as a normal floating-point number in a floating-point format to be used for the floating-point result value; in which: the tininess detection circuitry is configured to detect the tininess status based on the injection-rounded significand generated by the floating-point processing circuitry.

Further aspects, features and advantages of the present technique will be apparent from the following description of examples, which is to be read in conjunction with the accompanying drawings.

DESCRIPTION OF EXAMPLES

Figure 1:
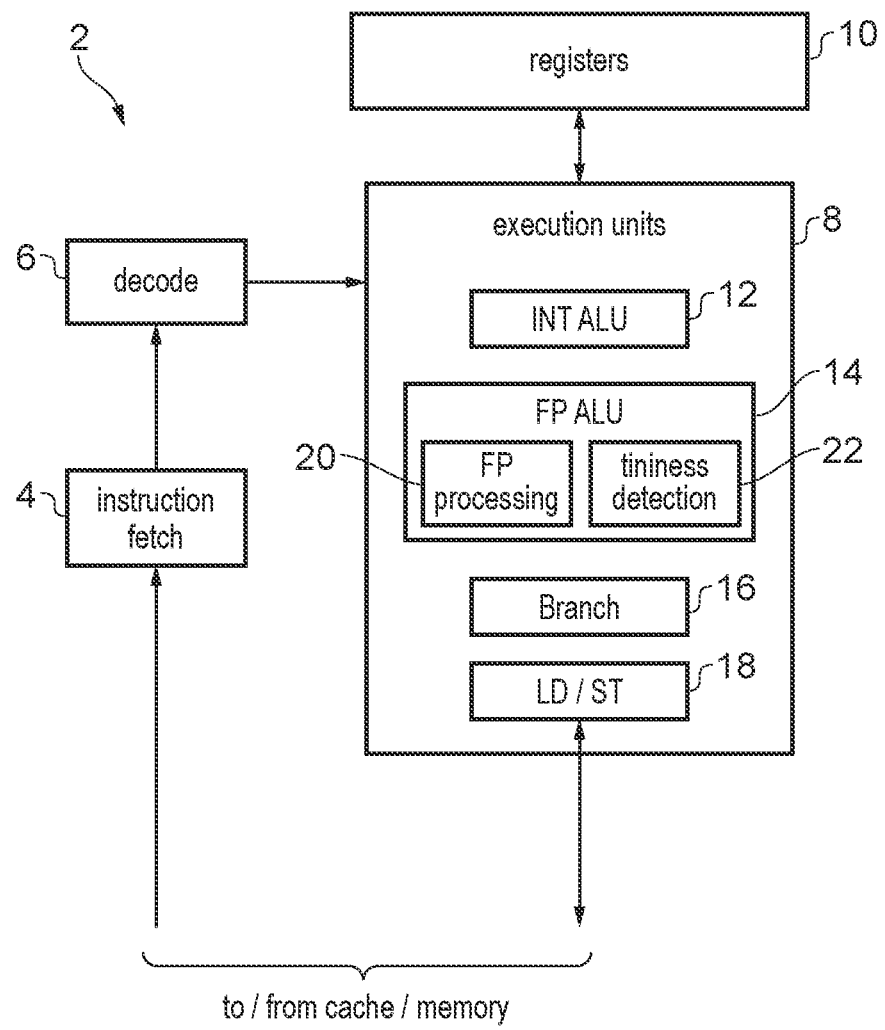
FIG. 1 schematically illustrates an example of a data processing apparatus having floating-point processing circuitry.

The IEEE-754 floating-point standards define the concept of tininess for an outcome of a floating-point operation. An outcome of a floating-point operation is considered "tiny" if the outcome corresponds to a non-zero number having a magnitude smaller than a minimum non-zero magnitude representable as a normal floating-point number in the floating-point format to be used for a floating-point result value. Hence, an apparatus has floating-point processing circuitry to perform a floating-point operation with rounding to generate a floating-point result value, and tininess detection circuitry to detect tininess status indicating whether an outcome of the floating-point operation is tiny. The tininess status can be useful for determining whether to signal an underflow exception for the floating-point operation, which may indicate to software or to a programmer that the true result of the floating-point operation had a magnitude too small to be exactly represented in the floating-point format being used.

The IEEE-754 standards define a condition that has to be satisfied in order for a result to be considered tiny, but offer no practical suggestion about how to implement tininess detection circuitry for detecting whether the outcome is tiny. Hence, processor micro-architects have circuit design decisions to make about how to implement the hardware circuit logic of the tininess detection circuitry. The design of the tininess detection circuitry involves design decisions that are not implicit from the definition of tininess provided by the standards. The standards define two alternative ways for detecting tininess. For example, the IEEE-754 1985 standard defines (where Emin refers to the minimum exponent representable for normal floating-point numbers in the floating-point format being used):

"Tininess may be detected either:
1. After rounding—when a nonzero result computed as though the exponent range were unbounded would lie strictly between $\pm 2^{Emin}$
2. Before rounding—when a nonzero result computed as though both the exponent range and the precision were unbounded would lie strictly between $\pm 2^{Emin}$."

It is generally expected that any particular implementation of a processor will implement only one of before rounding tininess detection and after rounding tininess detection. In general, before rounding tininess detection may be simpler to implement in circuitry, but implementing after rounding tininess detection may help to reduce the number of underflow exceptions which end up being generated (sometimes, rounding may cause a tiny unrounded result to be rounded to a non-tiny rounded value, so detecting tininess after rounding can reduce the number of underflows). Although the definitions of before rounding and after rounding tininess may appear similar, in practice tininess detection would typically be implemented in a totally different way depending on which is used for a given processor implementation. For example, one may expect that, given that after rounding tininess does not allow the precision to be unbounded, the after rounding tininess detection may require a rounding increment to be calculated and added to a significand derived from the floating-point operation, but this would not be required for before rounding tininess detection.

In the examples discussed below, the tininess detection circuitry comprises hardware circuit logic configured to support both before rounding tininess detection and after rounding tininess detection for detecting the tininess status. This is counter-intuitive, because the IEEE standards only require one of these to be supported and it would appear that supporting the second technique would unnecessarily introduce extra circuit logic for no benefit. However, the inventors recognised that, surprisingly, it is possible to implement before rounding and after rounding tininess detection with a reasonable amount of sharing of circuit logic in hardware, despite the differences in the definition of tininess provided by the standard, and so the amount of additional circuit logic needed in hardware to support both techniques for tininess detection may be limited. Also, it can be useful to support both types of tininess detection so that a single hardware apparatus can emulate the outcomes of floating-point processing achieved on different processor designs which may support either type of tininess detection. For some calculations, the tininess status may have different outcomes depending on whether before rounding or after rounding tininess detection is used and if software designed for a first processor which uses after rounding tininess detection is executed on a second processor which offers before rounding tininess detection (with suitable translation into the native instruction set of the second processor, if necessary), then differences in underflow signalling may be visible to the software which may be undesirable if trying to emulate the behaviour of the first processor. Hence, providing hardware circuit logic with support for both before rounding and after rounding tininess detection can increase the range of software which can be handled by a given processor implementation.

The tininess detection circuitry may comprise a shared data path used for both the before rounding tininess detection and the after rounding tininess detection. By sharing a common data path, this restricts the amount of additional circuit logic needed in hardware to support both techniques for tininess detection.

The tininess detection circuitry may have selection circuitry to select, based on whether the tininess detection circuitry is to perform the before rounding tininess detection or the after rounding tininess detection, an intermediate value (other than the tininess status itself) for using in determining the tininess status. Hence, while some parts of the tininess detection circuitry may be common for both techniques, other parts may involve a selection based on whether before rounding or after rounding tininess detection is used, and the selected intermediate value selected by the selection circuitry may contribute to the overall tininess status determined by the tininess detection circuitry. As the selection circuitry is selecting an intermediate value at an intermediate point of the tininess detection circuitry, rather than merely selecting between final values for a before rounding tininess status and an after rounding tininess status, this means that the amount of circuitry logic sharing between both techniques can be higher than if completely separate data paths were provided for before rounding and after rounding tininess detection respectively and the only selection was between final values for before/after rounding tininess status.

The tininess detection circuitry may select, based on a software-programmable control parameter, whether to detect the tininess status according to the before rounding tininess detection or the after rounding tininess detection. For example the control parameter could be a value held in a software-writable register, or could be specified as a parameter of an instruction which causes the floating-point processing circuitry to perform the floating-point operation. Hence, software can influence whether the tininess status should be defined according to before rounding tininess or after rounding tininess, depending on the needs of the software being executed. In some cases, the software that sets the parameter which influences the type of tininess detection performed may be the same software that is actually performing the floating-point operation itself (the operation which is having its outcome analysed for tininess). Alternatively, the software-programmable control parameter could be set by more privileged software than the software actually performing the floating-point operation whose tininess status is being detected.

The floating-point processing circuitry can perform the rounding for the floating-point operation in different ways. In one example, the floating-point processing circuitry may perform injection rounding to generate an injection-rounded significand for the floating-point result value. Injection rounding is a technique where addition of a rounding value is performed as part of the same addition as an addition already being performed as part of the floating-point operation itself, so that there is no need for any separate addition of a rounding increment after the floating-point operation has generated its floating-point result value.

In an example shown below, when the floating-point processing circuitry uses injection rounding, the tininess detection circuitry may detect the tininess status based on the injection-rounded significand, for both the before rounding tininess detection and the after rounding tininess detection. This may be seen as counter-intuitive since one would think that the before rounding tininess detection would require visibility of an unrounded significand before any rounding has been applied. However, the inventors recognised that it is possible to deduce the tininess status for before rounding tininess detection based on the injection-rounded significand so that the combined tininess detection circuitry is compatible with use of injection rounding, which can be useful for improving performance. Similarly, analysis of the definition of after rounding tininess in the IEEE standards may lead one to expect that the after rounding tininess detection would not be compatible with injection rounding because the rounding needed for the tininess detection may be different to the rounding needed for the result itself, but again the inventors recognised that based on analysis of bits of the injection-rounded significand it is possible to deduce the tininess status to make after rounding tininess detection compatible with injection rounding.

Hence, in another example, an apparatus comprises floating-point processing circuitry to perform a floating-point operation with injection rounding to generate an injection-rounded significand for a floating-point result value, and tininess detection circuitry to detect a tininess status indicating whether an outcome of the floating-point operation is tiny, where a tiny outcome corresponds to a non-zero number with a magnitude smaller than a minimum non-zero magnitude representable as a normal floating-point number in a floating-point format to be used for the floating-point result value. The tininess detection circuitry is configured to detect the tininess status based on the injection-rounded significand generated by the floating-point processing circuitry. Hence, even in processors which only support one of before rounding and after rounding tininess detection (but not both), providing hardware circuit logic supporting detection of tininess status based on an injection-rounded significand can be helpful for performance.

Alternatively, the floating-point processing circuitry may perform non-injection rounding, where the floating-point processing circuitry generates an unrounded significand and the floating-point processing circuitry comprises non-injection rounding circuitry to round the unrounded significand to generate a rounded result significand for the floating-point result value. In this case, the tininess detection circuitry may detect the tininess status based on the unrounded significand, for both the before rounding tininess detection and the after rounding tininess detection.

Regardless of whether the floating-point processing circuitry is performing injection rounding or non-injection rounding, the floating-point processing circuitry may perform the rounding by selectively performing a rounding addition to generate a rounded result significand for the floating-point result value. If injection rounding is being performed then this rounding addition may be part of the same addition used in the floating-point operation itself, or if non-injection rounding is used then the rounding addition can be a separate addition from any addition being performed to generate the floating-point result in the floating-point operation being performed.

For after rounding tininess detection, the tininess detection circuitry may perform the after rounding tininess detection without performing any further rounding addition other than the rounding addition already being performed by the floating-point processing circuitry to generate the rounded result significand for the rounded floating-point result. This may be counter-intuitive because one would think that after rounding tininess detection does require rounding to be performed, which is not the same type of rounding as the rounding for the result itself due to the "unbounded exponent" requirement of after rounding tininess defined in the standards, and so normally one would expect a further rounding addition to be required. However, the inventors recognised that such a further rounding increment addition is not necessary because it is possible to analyse bits of a significand derived from the output of the floating-point processing circuitry with a relatively simple set of Boolean logic gates to deduce the after rounding tininess status without needing any further rounding increment to be added. This is possible for both implementations which use non-injection rounding, and implementations which use injection rounding. This is helpful because additions tend to be slow in terms of performance and so avoiding a further rounding addition can reduce the overall latency of the tininess detection, improving performance.

More particularly, the tininess detection circuitry comprises increment determining circuitry to determine, based on a significand derived from an unrounded significand or an injection-rounded significand output by the floating-point processing circuitry, an after rounding tininess detection rounding increment for after rounding tininess detection; and when performing the after rounding tininess detection, the tininess detection circuitry is configured to determine the tininess status based on the after rounding tininess detection rounding increment determined by the increment determining circuitry, without adding the after rounding tininess detection rounding increment to the significand derived from the unrounded significand or the injection-rounded significand. Hence, for after rounding tininess detection, while an after rounding tininess detection rounding increment can be determined, it is not necessary to add it to the significand as instead the tininess status can be deduced from the after rounding tininess detection rounding increment through sets of Boolean logic gates, rather than an adder. This improves performance.

In the floating-point operation, the floating-point processing circuitry may generate a result exponent, and either an unrounded significand or an injection-rounded significand, depending on whether rounding is performed by non-injection rounding or injection-rounding as discussed above. The apparatus may have shifting circuitry to shift the unrounded significand or the injection-rounded significand by a variable number of bits, to generate a shifted significand. The tininess detection circuitry may detect the tininess status based on the shifted significand generated by the shifting circuitry, for both the before rounding tininess detection and the after rounding tininess detection. Hence, the shifting circuitry may be shared for both types of tininess detection.

The variable number of bits to be used for the shift may be selected by shift control circuitry. When the result exponent E is less than a minimum exponent Emin supported by the floating-point format for non-zero normal floating-point numbers, the shift is a right shift by Emin−E bits. When the result exponent is greater than or equal to the minimum exponent and a most significant bit of the unrounded significand or injection-rounded significand is 1, the variable number of bits is 0. When the result exponent is greater than or equal to the minimum exponent Emin and a most significant bit of the unrounded significand or the injection-rounded significand is 0, the shift is a left shift by a number of bits corresponding to a minimum of lzc and (E−Emin), where lzc is a number of leading zeroes in the unrounded significand or the injection-rounded significand. This approach provides a shifted significand which can be used as a basis for both before rounding and after rounding tininess detection.

The tininess detection circuitry may have range identifying circuitry which identifies whether a result magnitude represented by the result exponent and the unrounded significand or the injection-rounded significand is within a predetermined range, for which the before rounding tininess detection and the after rounding tininess detection are capable of providing different outcomes for the tininess status in at least one rounding mode. By providing such range identifying circuitry this means that the circuit hardware design can be simplified because more careful analysis of the unrounded significand or injection-rounded significand (or a derived significand such as the shifted significand mentioned earlier) can be restricted to those cases where tininess status could vary for before/after rounding tininess. Outside that range it can be much simpler to set the tininess status without careful analysis of particular bit values of less significant bits of the shifted significand. Hence, identifying whether the result magnitude is in a certain range reduces the number of possibilities that require consideration, and hence simplifies the circuit hardware design.

The range identifying circuitry may identify the result magnitude being within the predetermined range, based on the shifted significand. For example a certain number of most significant bits of the shifted significand may be analysed to determine whether the result magnitude is within the predetermined range.

When the result magnitude is determined by the range identifying circuitry to be within the predetermined range, at least for the after rounding tininess detection and for at least one rounding mode, the tininess detection circuitry is configured to set the tininess status based on one or more lower bits of the shifted significand which are at bit positions which would be discarded if the shifted significand was truncated to fit within the floating-point format to be used for the floating-point result; and when the result magnitude is determined by the range identifying circuitry to be outside the predetermined range, the tininess detection circuitry is configured to set the tininess status independent of said one or more lower bits of the shifted significand.

Hence, for values that are within the predetermined range, there is still no need to actually add a rounded increment as analysis of one or more lower bits of the shifted significand is enough to enable the tininess status to be determined. Outside of the predetermined range, the tininess status can be set independently of those one or more lower bits of the shifted significand. For example, when the result magnitude is determined by the range identifying circuitry to be greater the predetermined range, for both the before rounding tininess detection and the after rounding tininess detection, the tininess detection circuitry is configured to set the tininess status to indicate that the outcome of the floating-point operation is not tiny; and when the result magnitude is determined by the range identifying circuitry to be smaller than the predetermined range, for both the before rounding tininess detection and the after rounding tininess detection, the tininess detection circuitry is configured to set the tininess status to indicate that the outcome of the floating-point operation is tiny. Hence, for magnitudes outside the predetermined range it is relatively simple to set the tininess status merely based on the range determination itself, without further analysis of the specific value within the range, simplifying the circuitry.

In some cases, the floating-point processing circuitry may support a number of different rounding modes. While there may be at least one rounding mode for which the before rounding and after rounding tininess detection can provide different outcomes when the result magnitude is within the predetermined range, this does not necessarily apply to all rounding modes and there could be at least one other rounding mode which provides the same outcome regardless of whether before or after rounding tininess detection is used when the result magnitude is within the predetermined range.

In a case where multiple rounding modes are supported, when the result magnitude is determined by the range identifying circuitry to be within the predetermined range, at least for the after rounding tininess detection, the tininess detection circuitry is configured to set the tininess status depending on which rounding mode is selected for the floating-point processing operation; and when the result magnitude is determined by the range identifying circuitry to be outside the predetermined range, the tininess detection circuitry is configured to set the tininess status independent of which rounding mode is selected for the floating-point processing operation. Hence, another advantage of providing the range identifying circuitry is that rounding mode-specific decisions only need to be made in cases when the result magnitude is within the predetermined range while outside that range then it is not necessary to consider the rounding mode in order to set the tininess status. Whether before rounding tininess detection is dependent on rounding mode may depend on whether non-injection rounding or injection rounding is used for the floating-point operation— for non-injection rounding it is not necessary for the before rounding tininess detection to depend on the rounding mode, but for injection rounding the before rounding tininess detection can depend on the rounding mode used in cases when the result magnitude is within the predetermined range.

The definition of the predetermined range may vary depending on whether injection rounding or non-injection rounding is used. In general the predetermined range may cover a relatively small range of number magnitudes close to the minimum normal positive non-zero number representable in the floating-point format, and so in the majority of floating-point operations the result magnitude may be determined to be outside the predetermined range. Since the range in which the tininess status can vary depending on after or before rounding tininess detection is relatively small then this reduces the number of possible scenarios to an extent where it is possible to deduce from inspection of less significant bits of the shifted significand which scenario has occurred, and hence determine the tininess status accordingly, without a rounding addition or normalizing left shift (for after rounding tininess detection) being necessary.

In the case of non-injection rounding, the floating-point processing circuitry may generate the unrounded significand and so the range determination may be based on the shifted significand generated from the unrounded significand by the shifting circuitry as discussed above. In that case, the range identifying circuitry may determine that the result magnitude is within the predetermined range when the result magnitude x satisfies the bounds $2^{Emin} > x \geq 2^{Emin} - ulp/2$, where ulp is a minimum positive non-zero number representable as a subnormal number in the floating-point format to be used for the floating-point result value. Whether the result magnitude is within this predetermined range can be determined by analysing the upper k+1 bits of the shifted significand, where k is the number of significant bits (including an implicit leading bit which will not be part of the stored fraction of the floating-point number) which are defined in the floating-point format being used. In other words, for double precision, single precision and half precision floating-point formats, k=53, 24, 11 respectively and so the upper 54, 25 or 12 bits of the shifted significand can be analysed to identify whether the result magnitude is within the predetermined range.

In the case of non-injection rounding, the analysis of the one or more lower bits of the shifted significand may be performed when after rounding tininess detection is used, to determine the tininess status. However, for the before rounding tininess detection the tininess detection circuitry may simply set the tininess status to indicate that the outcome of the floating-point operation is tiny in cases where the result magnitude is within the predetermined range. Hence, with non-injection rounding and before rounding tininess detection, the determination that the magnitude is within the predetermined range is enough to be able to deduce the tininess status without any further analysis.

On the other hand, if injection rounding is being used by the floating-point processing circuitry and so the shifted significand is generated from an injection-rounded significand, the predetermined range may be different to the non-injection rounded case. In this case, the range identifying circuitry is configured to determine that the result magnitude is within the predetermined range when the result magnitude x satisfies the bounds $2^{Emin}+ulp>x\geq 2^{Emin}$, where ulp is a minimum positive non-zero number representable as a subnormal number in the floating-point format to be used for the floating-point result value. Again, whether the result magnitude is within this range can be analysed from the shifted significand. In the case of injection rounding, the upper k bits of the shifted significand are enough to decide on whether the result magnitude is in the predetermined range, so for double precision, single precision or half precision floating-point formats respectively, this may be based on analysis of 53, 24 or 11 bits respectively.

In the case of injection rounding, when the result magnitude is within the predetermined range, some further analysis of one or more lower bits of the shifted significand may be performed both for before rounding tininess detection and for after rounding tininess detection. Hence, when the floating-point processing circuitry performs injection rounding and the result magnitude is within the predetermined range, for at least one rounding mode, for both the before rounding tininess detection and the after rounding tininess detection, the tininess detection circuitry is configured to set the tininess status based on one or more lower bits of the shifted significand which are at bit positions which would be discarded if the shifted significand was truncated to fit within the floating-point format to be used for the floating-point result. The specific logical functions used to map these one or more lower bits to the tininess status may differ for before rounding tininess detection compared to after rounding tininess detection, but nevertheless the range identifying circuitry may be common to both cases to share hardware circuit logic and hence reduce overall circuit area by having a shared data path.

Specific Apparatus Example

FIG. 1 schematically illustrates an example of a data processing apparatus 2, for example a processor such as a CPU (central processing unit). The apparatus 2 has instruction fetch circuitry 4 for fetching program instructions from a cache or memory, and decode circuitry 6 to decode the fetched instructions to generate control signals for controlling execution units 8 to perform processing operations represented by the instructions. The execution units 8 perform the processing operations on operands read from registers 10 and write results of the operations to the registers 10. The execution units 8 may include a number of different types of execution unit for executing different classes of instruction, such as an integer arithmetic/logic unit (ALU) 12 for performing arithmetic and logical operations on integer values, a floating-point ALU 14 for performing floating-point operations on numbers represented in a floating-point representation, a branch execution unit 16 for executing branch instructions which can trigger a non-sequential change of program flow, and a load/store unit 18 for processing load operations which load data from the cache or memory to the registers 10 or store operations which store data from the registers 10 to the cache or memory. It will be appreciated that this is just an example of some types of execution unit which could be provided, but other examples may have other types.

The floating-point ALU 14 has floating-point processing circuitry 20 for carrying out floating-point processing operations. Such floating-point processing operations could include arithmetic operations such as addition, subtraction, multiplication, divide or square root operations, as well as conversion operations for converting between different floating-point representations or converting between a floating-point representation and a non-floating-point representation (e.g. integer or fixed-point). The floating-point ALU also includes tininess detection circuitry 22 which will be discussed in more detail below and is provided for detecting a tininess status for an outcome of a floating-point operation performed by the floating-point processing circuitry 20. The tininess status indicates whether an outcome of the floating-point operation is tiny. An outcome is considered tiny if it corresponds to a non-zero number with a magnitude that is smaller than a minimum non-zero magnitude representable as a normal floating-point number in a floating-point format to be used for the floating-point result value generated in the floating-point operation being performed by the floating-point processing circuitry 20.

Introduction to Floating-Point Representation

Floating-point (FP) is a useful way of approximating real numbers using a small number of bits. The IEEE 754-2008 FP standard proposes multiple different formats for FP numbers, but some commonly used formats are binary 64 (also known as double precision, or DP), binary 32 (also known as single precision, or SP), and binary 16 (also known as half precision, or HP). The numbers 64, 32, and 16 refer to the number of bits required in the stored value for each format.

Representation

FP numbers are quite similar to the "scientific notation" taught in science classes, where instead of negative two million we'd write $-2.0\times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers all consist of a sign bit, some number of biased exponent bits, and some number of fraction bits. In particular, the formats we are interested in consist of the following bits:

TABLE 1

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign} \times 1.\text{fraction} \times 2^e$$

where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

TABLE 2

| sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 | | -infinity |
| 0 | 11111 | 00_1111_0011 | | NaN |

A large part of the complexity of FP implementation is due to subnormals, therefore they are often handled by microcode or software. Some processor implementations handle subnormals in hardware, speeding up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001

−1=1001

In two's complement representation, an n-bit integer i is represented by the low order n bits of the binary n+1-bit value $2^n+i$, so a 4-bit two's complement integer would represent plus and minus one as:

+1=0001

−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are:

TABLE 3

| mode | | definition |
|---|---|---|
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L—(least) the least significant bit of the truncated value

G—(guard) the next most significant bit (i.e. the first bit not included in the truncation)

S—(sticky) the logical OR of all remaining bits that are not part of the truncation Given these three values and the truncated value, we can always compute the correctly rounded value according to the following table:

TABLE 4

| mode | change to the truncated value |
|---|---|
| RNE | increment if (L&G)|(G&S) |
| RNA | increment if G |
| RZ | none |
| RP | increment if positive & (G|S) |
| RM | increment if negative & (G|S) |
| RX | set L if G|S |

For example, consider multiplying two 4-bit significands, and then rounding to a 4-bit significand.
sig1=1011 (decimal 11)
sig2=0111 (decimal 7)
multiplying yields
sig1×sig2=1001_101 (decimal 77)
L Gss
The least significant bit of the truncated 4-bit result is labeled L, the next bit G, and S is the logical OR of the remaining bits labeled s (i.e. S=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

Rounding Integer and Fixed-Point Numbers

If we convert an FP number to integer or fixed-point we also have to round. The concept is basically the same as FP rounding. An FP number that happens to be an integer always rounds to that integer. All other FP numbers lie between two consecutive integers, and rounding dictates which integer is returned. Unfortunately the rounding logic for integers is somewhat harder because of the differences between two's complement and sign-magnitude form. Incrementing a sign-magnitude number always increases the magnitude, so the incremented number is farther away from zero. The same thing happens for positive two's complement numbers, but negative two's complement numbers become closer to zero when incremented. This means that the rounding logic has to change based on whether the integer is positive or negative. It also means we have to be careful in picking the base value (the value which will be incremented or not). For positive integers, that value is just the truncated FP significand, so 1.37 will have a base value of 1, and a result of either 1 or 2. For negative integers, we again truncate the significand and take the one's complement of the result (one's complement is the original number with all bits inverted), -1.37 is truncated to 1 and then inverted, giving a base value of -2. Everything then works out since we want our result to be either -2 or (when incremented) -1.

To further complicate things, our method of conversion requires some computation to find L, G, and S for negative integers. Correct rounding would require us to complete the two's complement process (invert and add 1) and then compute L, G, and S, but adding that 1 is slow compared to just inverting. Ideally we would like to compute the actual L, G, and S from the original shifted input (i.e., from the input before we've done anything about signs. So the floating-point 1.37 or -1.37 would both be right shifted to the integer 1).

Let L0, G0, and S0 be the least significant bit (lsb), guard and sticky before inverting, and let Li, Gi, and Si be lsb, guard and sticky after inverting, and finally let L, G, and S be the lsb, guard and sticky after inverting and adding 1.

If S0 is zero, then the bits contributing to Si are all ones, and hence S (obtained by adding 1 to those Si bits) is also zero. If S0 is nonzero, then Si is not all ones, and hence S is nonzero. So in all cases S0=S.

If G0 is zero, then Gi is 1, and G is also one except for the case when there is a carry-in from the S bits, which only happens when S0 is zero. If G0 is 1, then Gi is zero, and again G is also zero except for the case where there is a carry-in from the S bits, which only happens when S0 is zero. So G=G0 ^S0.

By very similar logic, L=L0 ^(G0|S0).

Now that we have L, G, and S for both negative and positive integers, we can come up with our rounding rules:

TABLE 5

| mode | change to a positive value | change to a negative value |
|---|---|---|
| RNE | increment if (L&G)|(G&S) | increment if (L&G)|(G&S) |
| RNA | increment if G | increment if (G&S) |
| RZ | none | increment if (G|S) |
| RP | increment if (G|S) | increment if (G|S) |
| RM | none | none |
| RX | set L if G|S | set L if G|S |

Fixed-point numbers round exactly the same way as integers. The rules for unsigned conversions (to integer or fixed-point) are the same as the rules for positive conversions.

Injection Rounding

A faster way to do rounding is to inject a rounding constant as part of the significand addition that is part of almost every FP operation. To see how this works, consider adding numbers in dollars and cents and then rounding to dollars. If we add
$1.27
+$2.35
$3.62

We see that the sum $3.62 is closer to $4 than to $3, so either of the round-to-nearest modes should return $4. If we represented the numbers in binary, we could achieve the same result using the L, G, S method from the last section. But suppose we just add fifty cents and then truncate the result?
1.27
+2.35
+0.50 (rounding injection)
4.12

If we just returned the dollar amount ($4) from our sum ($4.12), then we have correctly rounded using RNA rounding mode. If we added $0.99 instead of $0.50, then we would correctly round using RP rounding. RNE is slightly more complicated: we add $0.50, truncate, and then look at the remaining cents. If the cents remaining are nonzero, then the truncated result is correct. If there are zero cents remaining, then we were exactly in between two dollar amounts before the injection, so we pick the even dollar amount. For binary FP this amounts to setting the least significant bit of the dollar amount to zero.

Adding three numbers is only slightly slower than adding two numbers, so we get the rounded result much more quickly by using injection rounding than if we added two significands, examined L, G, and S, and then incremented our result according to the rounding mode.

Implementing Injection Rounding

For FP, the rounding injection is one of three different values, values which depend on the rounding mode and (sometimes) the sign of the result.

Both RNA and RNE require us to inject a 1 at the G position (this is like adding $0.50 in our dollars and cents example).

RP and RM rounding depends on the sign as well as the mode. RP rounds positive results up (increases the magnitude of the significand towards positive infinity), but truncates negative results (picking the significand that is closer to positive infinity). Similarly RM rounds negative results up (increasing the magnitude of the significand toward negative infinity), but truncates positive results (picking the significand that is closer to negative infinity). Thus we split RM and RP into two cases: round up (RU) when the sign matches the rounding direction, and truncation (RZ) when the sign differs from the rounding injection. For RU cases we inject a 1 at the G-bit location and at every location that contributes logically to S (this is like adding $0.99 in our dollars and cents example).

For RZ and RX modes, and for RP and RM modes that reduce to RZ mode, we inject zeros.

For most of the rounding modes, adding the rounding injection and then truncating gives the correctly rounded result. The two exceptions are RNE and RX, which require us to examine G and S after the addition. For RNE, we set L to 0 if G and S are both zero. For RX we set L to 1 if G or S are nonzero.

FP Number are not Real Numbers

It's tempting to think of FP numbers as being just like real numbers, but they are fundamentally different, even for the most basic properties:

1. They are not associative. For example, in SP we can add 3 numbers and return 1 million or zero, perhaps not what people think of as a rounding error:

$(2^{45}+-2^{45})+2^{20}=2^{20}$ $2^{45}+(-2^{45}+2^{20})=0$

2. They don't obey the distributive laws. Again in SP:

$3,000,001*(4.00001+5.00001)=0x4bcdfe83$ $(3,000,001*4.00001)+(3,000,001*5.00001)=0x4bcdfe82$ and things get even worse in the presence of overflow:

$2^{50}*(2^{78}-2^{77})=2^{127}$ $(2^{50}*2^{78})-(2^{50}*2^{77})=infinity$

3. In some implementations, they aren't even commutative unless we are in default NaN mode (a mode that converts all NaNs to a single NaN), because in general nanA+nanB !=nanB+nanA. Numeric adds and multiplies are commutative.

4. Because of IEEE NaN rules, there are no multiplicative or additive identities. One and zero work as identities for numeric values.

One useful way to think of FP numbers is to consider them to be very long fixed-point numbers in which at most a few (53 for DP) consecutive bits can be nonzero. For example, non-infinite DP numbers can have the first bit of the significand in any of 2046 places, and that first bit is followed by 52 other significand bits, and there is a sign bit, so any finite DP number can be represented as a 2046+52+1=2099-bit fixed point number. Examined this way it becomes very obvious that adding two FP numbers does not, in general, result in another FP number: the result of the addition has to be rounded so that it becomes an FP number.

Tininess Detection

The IEEE-754 floating-point standards (1985, 2008, 2019) have two incompatible ways of detecting whether a computation yields a tiny result, "before rounding" and "after rounding". It can be useful to provide a part that detects tininess both ways, to aid with emulating behaviour of different processors which may use one or other of these ways of detecting tininess.

The standard offers two ways to detect tininess. From the 1985 standard:

"Tininess may be detected either

1. After rounding—when a nonzero result computed as though the exponent range were unbounded would lie strictly between $\pm 2^{Emin}$.

2. Before rounding—when a nonzero result computed as though both the exponent range and the precision were unbounded would lie strictly between $\pm 2^{Emin}$."

Underflow is signalled for final results that are both tiny and inexact. The IEEE 754 result returned for a floating-point operation is the same for both methods, and inexactness is also the same for both methods (inexact means the rounded and unrounded results are different).

Figure 2:
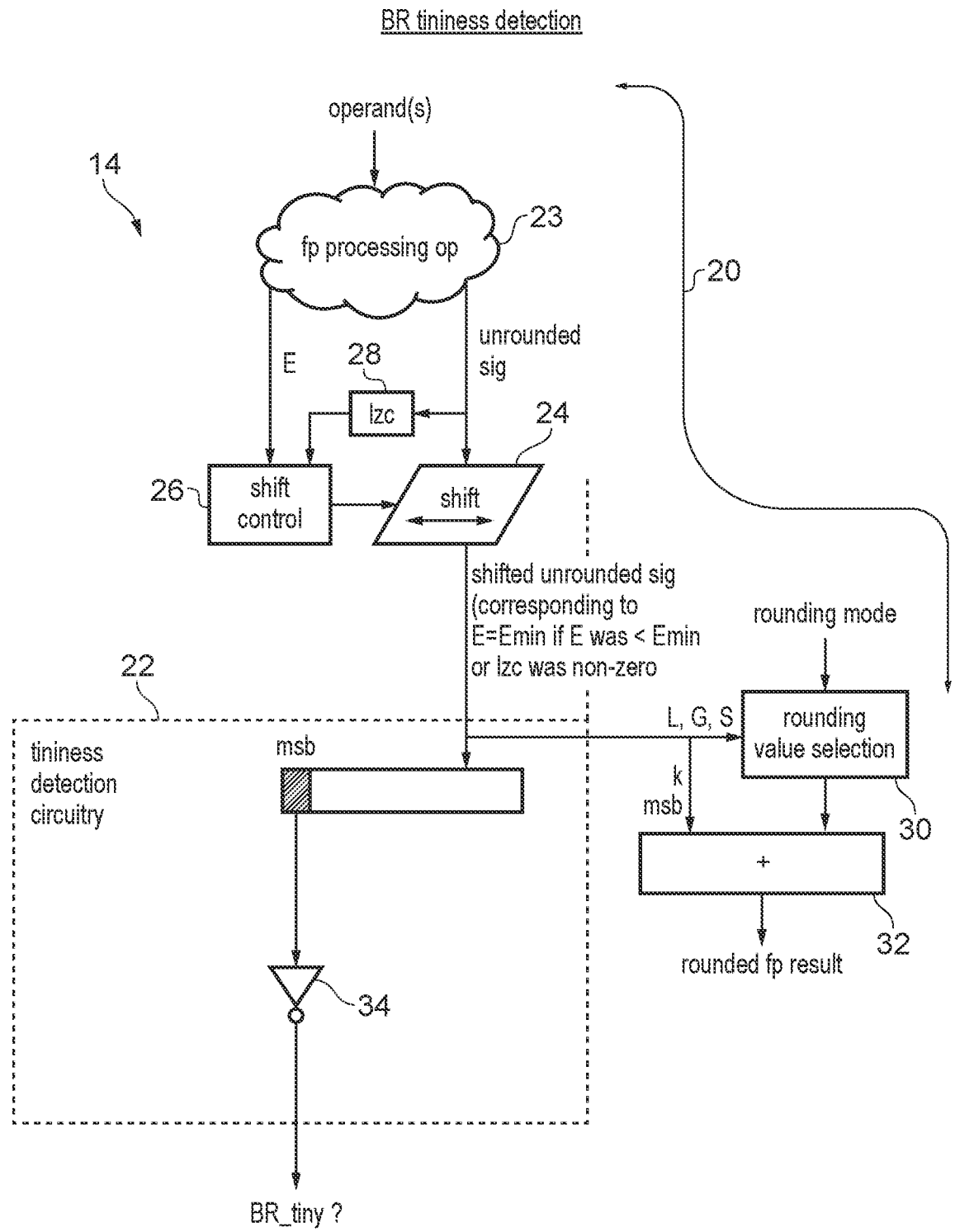
FIG. 2 schematically illustrates an approach for performing before rounding tininess detection.

FIG. 2 shows one approach to implementing before rounding tininess detection. Circuit logic 23 within the floating-point processing circuitry 20 first performs the floating-point operation (e.g. an addition or multiplication), to produce the unrounded result significand x, computed as if we had unbounded range and precision, and then if the unbounded exponent E is less than Emin, a shifter 24 right shifts that result so that the unrounded significand corresponds to the exponent Emin. Shift control circuitry 26 controls the shift amount used by the shifter 24. A leading zero counter 28 is also provided to count the number of leading zeroes (lzc) in the unrounded significand, and if the leading zero count is non-zero and the unbounded exponent E is greater than or equal to Emin, then the shifter 24 instead left shifts the unrounded significand by a number of bits corresponding to the minimum of lzc and E−Emin. Hence, the output of the shifter (a shifted significand) is either the result of the right/left shift performed in cases of E<Emin or lzc non-zero, to ensure that the significand is shifted to bit positions corresponding to an exponent value of Emin, or if the lzc was zero and E was greater than or equal to Emin already, the variable shift is by 0 bits, i.e. the shifted significand is equal to the unrounded significand.

Either way, determining whether x is "before rounding" tiny (BR_tiny) consists of looking at the first bit of the shifted unrounded significand:

If the leading bit is one, then the result is not BR_tiny

If the leading bit is zero, then the result is BR_tiny.

Hence, the before rounding tininess status is generated by a NOT gate (inverter) 34 which inverts the most significant bit of the shifted significand to generate the before rounding tininess status. In this example, the before rounding tininess detection circuitry 22 would simply comprise the NOT gate 34. The shift circuitry 24, shift control circuitry 26 and leading zero counter 28 can be considered part of the floating-point processing operation 20, since as well as being useful for tininess detection, shifting the unrounded result this way also has the advantage of making it easy to compute the correctly rounded result. For formats with k-bit significands (i.e. k−1 bit fractions), we now simply round at bit k. Hence, rounding value selection circuitry 30 may decide, based on analysis of status values L, G, S determined from the shifted significand, a rounding value to be added to shifted significand by adder 32, to generate the rounded floating point result. The rounding value selection is performed as shown in Table 4 above.

Figure 3:
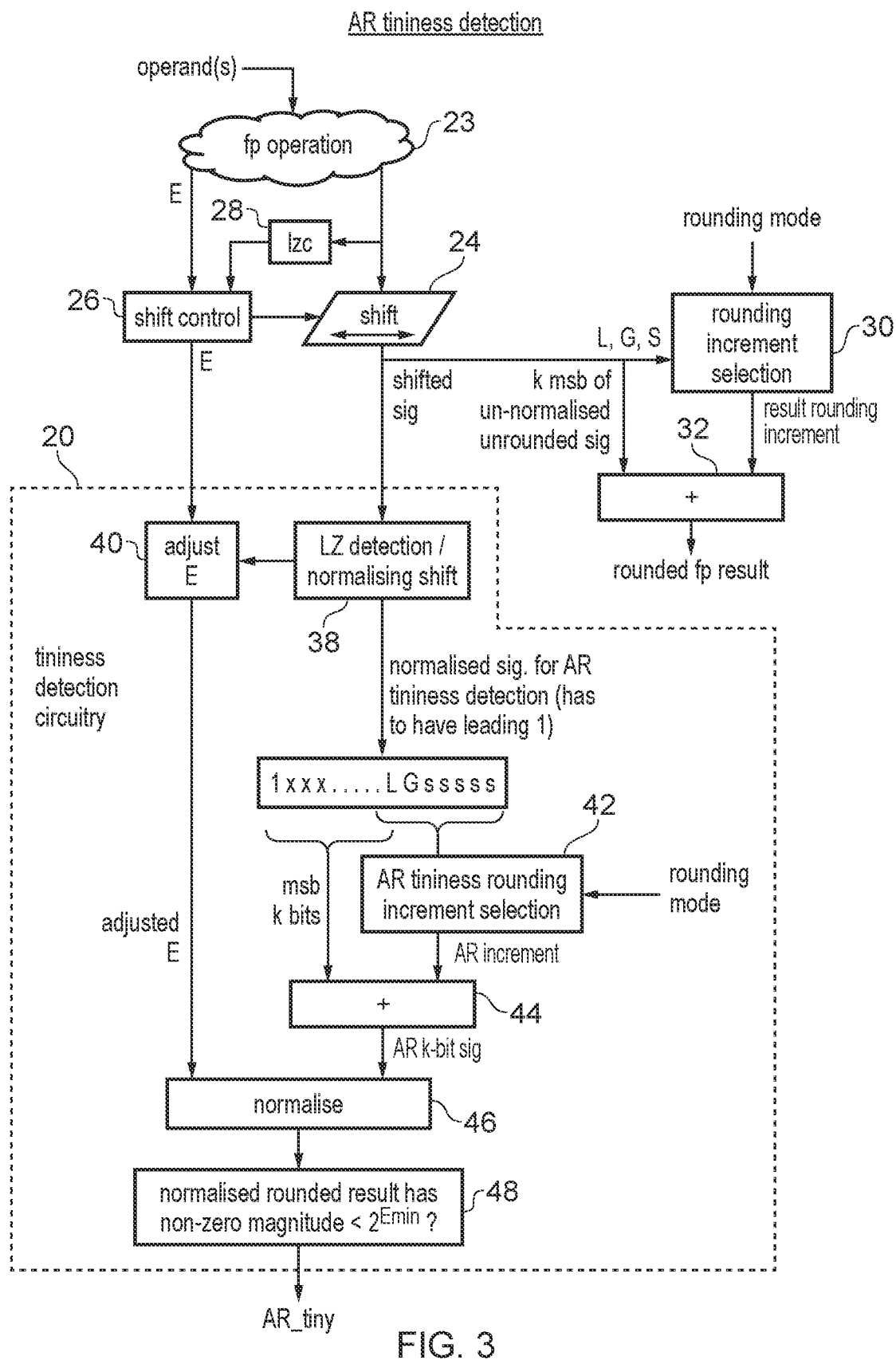
FIG. 3 illustrates an approach for performing after rounding tininess detection.

FIG. 3 shows an approach to performing after rounding tininess detection. This is not as straightforward as before rounding tininess detection, because there is a rounding step, and it is not the usual rounding due to the definition of after rounding tininess in the standard: "when a nonzero result computed as though the exponent range [but not the precision] were unbounded would lie strictly between $\pm 2^{Emin}$".

The unbounded exponent range means the "after rounding" test is done on a number that is always normalized, i.e., the significand begins with "1." Hence, as shown in FIG. 3, a normalising shift 38 based on leading zero detection is performed in the tininess detection circuitry 20 (and the exponent E adjusted by circuitry 40 to account for the normalisation). This normalisation is not needed for the standard floating-point result with rounding, because for values in the subnormal range the shift performed by shift circuitry 24 will have some leading zeroes, whereas shifter 38 ensures that, regardless of the value of exponent E, the shifted significand for tininess detection has a leading 1. If the format has k significand bits, normalised significand is rounded to a k-bit value that begins with a leading 1 (by performing after-rounding tininess rounding increment selection 42 based on status values bits L, G, S (where S is the logical OR of all bits labelled s that are less significant than G) according to the rounding mode being used, and then adding 44 the rounding increment to the shifted significand output by the normalising shift 38). As the rounded value has to have a leading 1, a further normalising shift 46 could still be required after the rounding addition 44 (the normalising shift 46 would be limited to a right shift by 1 bit if the tininess rounding caused an overflow). Using circuitry 46, 48, we then compute whether the k-bit rounded value lies "strictly between $\pm 2^{Emin}$" and determine tininess accordingly:

If the rounded value lies strictly between $\pm 2^{Emin}$ then the result is AR_tiny Otherwise the result is not AR_tiny (here "AR_tiny" signifies that the result has been found to be tiny using after rounding tininess detection).

Note that this tininess rounding computation has nothing to do with the value returned by the original FP operation. The "after rounding" tininess rounding is used strictly to determine tininess, after which the tininess rounded value is discarded. Hence, separate from the after rounding tininess detection, the shifted significand generated by shifter 24 is also subject to rounding increment selection 30 and addition 32 in the same way as shown in FIG. 2. Hence, there are two separate rounding additions at 32 and 44.

Combined Before Rounding and after Rounding Tininess Detection with Non-Injection Rounding In a typical processor hardware design, the tininess detection circuitry 22 performs only one of the before rounding and after rounding tininess detection. This is because the IEEE-754 standard does not require both to be supported and so one may consider the additional logic for supporting a second tininess detection technique to be unnecessary. Also, as shown in FIGS. 2 and 3 the techniques for detecting before rounding and after rounding tininess detection may typically have been regarded as requiring completely different circuit logic so that little sharing of circuitry is possible.

However, the inventors have recognised that by analysing the bits of a shifted significand in cases where the result magnitude is within a particular range, it is possible to provide a unified data path for both before rounding and after rounding tininess detection which supports both techniques with relatively efficient circuit logic, even in the case of after rounding tininess detection where, contrary to the approach shown in FIG. 3, it is not necessary to actually perform a rounding addition beyond that already being performed for the rounding of the actual floating-point result of the floating-point processing operation.

This exploits a series of realisations as follows.

Recall that rounding chooses between two consecutive FP numbers. Define ulp as a unit in the lowest place, the magnitude of the low-order bit of a significand with a given exponent (i.e. in the specific case of values where the exponent is Emin, ulp is the minimum subnormal number representable in the floating-point format being used), and let x be our unrounded result of the floating-point operation.

Any $x >= 2^{Emin}$ will round to something $>= 2^{Emin}$, so x is not AR_tiny.

Any $x <= 2^{Emin} - \text{ulp}$ will round to something $<= 2^{Emin} - \text{ulp}$, so x is AR_tiny.

This leaves a very small range of numbers that require further testing,
$2^{Emin} > x > 2^{Emin} - \text{ulp}$.

For formats with k-bit significands, all of the shifted unrounded numbers x in this range consist of a leading zero followed immediately by at least k−1 ones. The unrounded shifted result now has the following parts (starting with the high-order bit):

1) Integer bit (always zero in this range).
2) k−1 fraction bits (always all ones in this range).
3) G, a guard bit
4) R, the next bit after G
5) Any number of s or sticky bits.

For before rounding tininess detection, all values in this range $2^{Emin} > x > 2^{Emin} - \text{ulp}$ are tiny, and do not require any further analysis of G, R or s—the before rounding tininess status can be determined from parts 1) and 2) of the unrounded shifted result.

To determine if x is AR_tiny we have to (theoretically) normalize the value, so as there is a leading zero and the next bit is 1, there is a theoretical left shift by one bit position (in practice, this shift does not need to be performed, because we can simply treat the bits one place to the right of the normal L, G, S as the L, G, S values for rounding increment selection). Therefore, G becomes the low-order significand bit (equivalent to L in Table 4 above) for AR tininess determination. If that bit is zero, then AR_rounding (the rounding that would, theoretically, have been performed for AR tininess detection, but is not actually performed when AR tininess is determined as shown below) is bounded above by $2^{Emin} - \text{ulp}/2$, and so x is AR_tiny. Hence, actually the portion of the range where $2^{Emin} - \text{ulp}/2 > x > 2^{Emin} - \text{ulp}$ can be excluded from consideration as well, because numbers in that range cannot be AR-tininess-rounded to reach something non-tiny.

The only remaining case is when G is one, which for the range of x stated above applies to numbers in the range $2^{Emin} > x \geq 2^{Emin} - \text{ulp}/2$. In this case x could (under AR_rounding) become either $2^{Emin} - \text{ulp}/2$ (which is AR_tiny) or $2^{Emin}$ (which is not AR_tiny).

Therefore, the range to check is $2^{Emin} > x \geq 2^{Emin} - \text{ulp}/2$, which can be decided based on the top k+1 bits of the unrounded shifted significand (i.e. the G bit is considered as well as the top k−1 fraction bits after the leading zero that are more significant than the point at which truncation would be applied to form a k-bit significand (with k−1 bit stored fraction) in the floating-point format being used).

The rounding computation is the same as used in Table 4 of the FP overview shown above, but instead of using L, G and S as normal, the after-rounding increment (ARI) is computed using:

AR_L=G=1

AR_G=R

AR_S=logical OR of all of the bits labelled s (this account for the theoretical one-bit left shift mentioned above).

The computation of ARI varies according to rounding mode, but for 3 rounding modes of interest (RNE, RU, RZ) we have:

TABLE 6

| mode | ARI |
|---|---|
| RNE | R |
| RU | R\|AR_S |
| RZ | 0 |

(note that RU corresponds to RP shown in Table 4 if the value is positive and RM if the value is negative).

In all these examples, ARI is easily computed without actually doing any rounding, so there is no need for any additional rounding adder other than the adder 32 already provided for rounding.

Putting it all together, given the shifted unrounded significand x we can compute both BR_tiny and AR_tiny according to Table 7:

TABLE 7

| range | Shifted unrounded significand | BR_tiny | AR_tiny |
|---|---|---|---|
| $x \geq 2^{Emin}$ | 1 followed by anything (or result exponent E > Emin) | 0 | 0 |
| $2^{Emin} > x \geq 2^{Emin} - ulp/2$ | 0 followed by at least k consecutive ones | 1 | ~ARI |
| $2^{Emin} - ulp/2 > x$ | 0 followed by less than k consecutive ones | 1 | 1 | where k is the number of bits in the significand (including the implicit leading 1 or 0 which will not be part of the stored fraction F) of the floating-point format being used.

Figure 4:
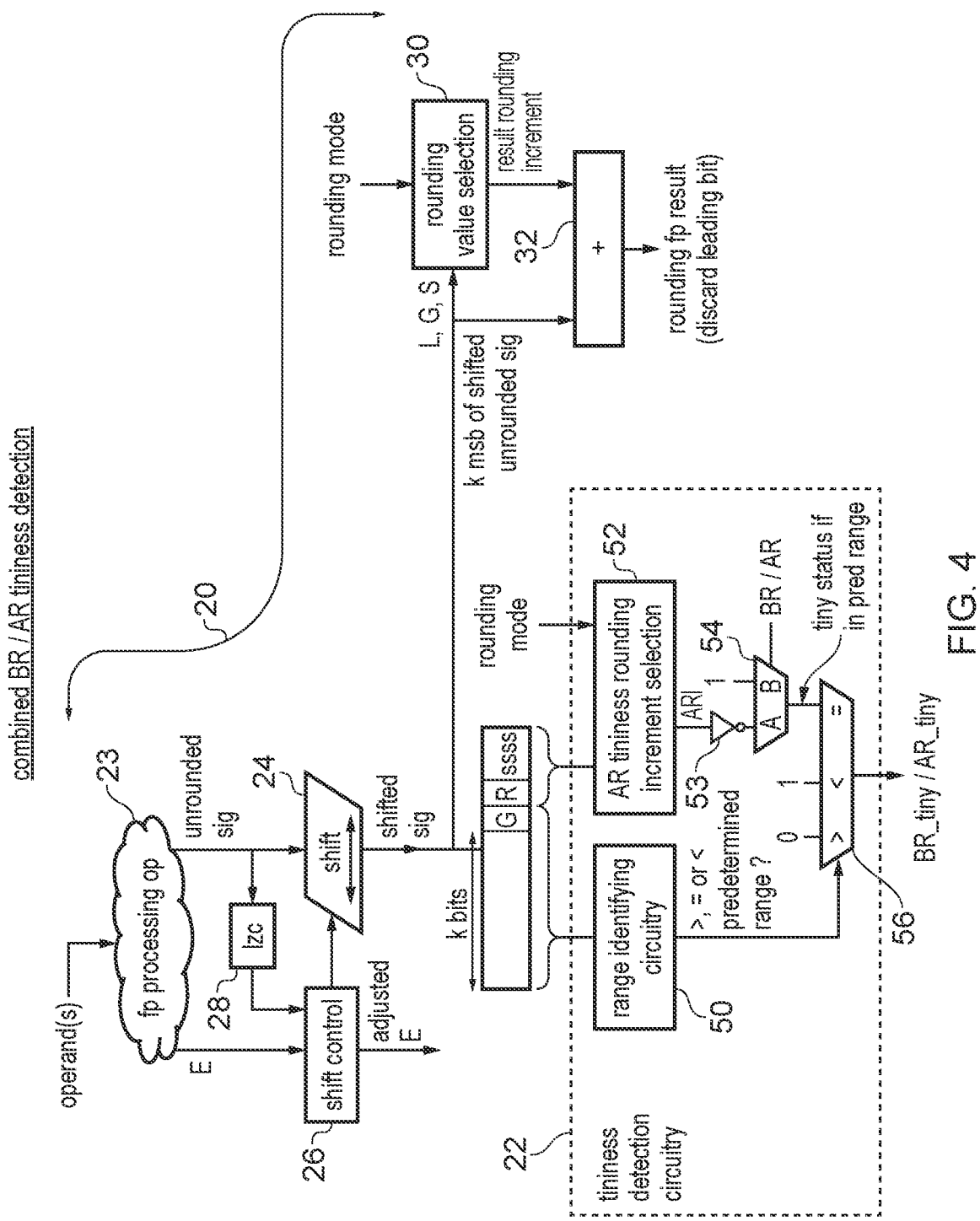
FIG. 4 shows a first example of combined tininess detection circuitry which can perform both before rounding tininess detection and after rounding tininess detection.

Putting this into practice, FIG. 4 schematically illustrates an example of combined tininess detection circuitry for detecting both before rounding and after rounding tininess status in an example that uses non-injection rounding for the floating-point operation. The floating-point processing circuitry 20 is the same as shown in FIGS. 2 and 3 and so includes the circuit logic 23 for performing the floating-point processing operation itself (e.g. the logic 23 may be a floating-point adder or multiplier). Also, the floating-point processing circuitry 20 includes the shift circuitry 24, shift control circuitry 26 and leading zero count circuitry 28 as in FIG. 2. The shift circuitry 24 applies a variable right or left shift depending on the difference between the exponent E and the minimum exponent Emin and the leading zero count of leading zeroes of the unrounded significand generated by the floating-point operation, to generate the shifted significand. Also, the floating-point processing circuitry 20 includes the rounding value selection circuitry 30 and the rounding adder 32 for adding a rounding value to the shifted unrounded significand, with the rounding value being selected based on the LGS bits of the shifted unrounded significand according to the rounding mode being used (e.g. see Table 4 above).

In contrast to FIGS. 2 and 3, the tininess detection circuitry 22 in FIG. 4 includes range identifying circuitry 50, after rounding (AR) tininess rounding increment selection circuitry 52, and multiplexers 54, 56 for selecting the output value for the tininess status depending on whether before rounding or after rounding tininess detection is being performed and on the signal generated by the range identifying circuitry 50 indicating whether the result magnitude for the result generated by the floating-point processing operation 23 is greater than, within, or less than a predetermined range.

As discussed above, the range identifying circuitry checks the upper k+1 bits of the shifted significand. If the leading bit of the shifted significand is 1 then the result magnitude is determined to be greater than the predetermined range (in other examples, results greater than the predetermined range could also be identified from whether the exponent E, after adjustment to account for the shift applied by shifter 24, is greater than Emin). If the most significant bit of the shifted significand is 0 and it is followed by at least k consecutive 1s then the result magnitude is within the predetermined range. If the most significant bit of the shifted significand is 0 and this is followed by less than k consecutive 1s then the result magnitude is less than the predetermined range.

The AR tininess rounding increment selection circuitry 52 determines the AR tininess rounding increment according to the rounding mode and the lower bits R and ssss of the shifted significand (while for conciseness FIG. 4 shows 4 bits labelled s, the number of s bits will vary depending on the precision generated by the floating-point operation). If the rounding mode is RZ, then the AR tininess rounding increment is 0. If the rounding mode is RNE, then the AR tininess rounding increment is equal to bit R which is two places below the least significant bit that will form part of the truncated k-bit significand for the result. If the rounding mode is RU then the AR tininess rounding increment corresponds to the result of combining bit R and all lower bits ssss in a logical OR operation (i.e. if any one or more of the lower bits R, ssss is 1 then the after rounding tininess rounding increment (ARI) is also 1). The AR tininess rounding increment ARI is inverted by a NOT gate 53 and supplied to multiplexer 54 which selects between the inverted value of ARI and a single bit value of 1 depending on whether the tininess detection is being performed according to after rounding or before rounding tininess detection. The output of multiplexer 54 represents the tininess status in the case when the result magnitude was found to be within the predetermined range and is set to 1 if before rounding tininess detection is being performed and to the inverse of ARI if after rounding tininess detection is performed.

The multiplexer 56 selects the final value for the tininess status depending on the output of the range identifying circuitry 50. If the range identifying circuitry 50 determines that the result magnitude is greater than the predetermined range then a tininess status value of 0 is output for both before rounding and after rounding tininess detection, to indicate that the result is not tiny. If the range identifying circuitry 50 identifies that the result magnitude is less than the predetermined range then a value of 1 is output as the tininess status to indicate that, for both before rounding and after rounding tininess detection, the result is tiny. If the range identifying circuitry 50 identifies that the result magnitude is within the predetermined range then the tininess status that is output by multiplexer 56 is the output of multiplexer 54 which was set based on whether before or after rounding tininess detection is being performed.

Hence, with this approach, the tininess detection circuitry can be implemented with relatively simple circuit logic in hardware, and with a common data path for both before rounding and after rounding tininess detection so that both types of tininess detection are supported in the same hardware implementation. Computing whether the result magnitude is within the predetermined range does not require any difficult comparison of specific bit values, as it is just a simple examination of the first k+1 bits of the unrounded significand and so no additions/subtractions or comparison of more arbitrary patterns of bits against comparison constants is required. The range computation can be done with a simple set of Boolean gates. For example, a signal indicating whether the result is greater than the range can simply be derived from the most significant bit of the shifted significand directly. A signal indicating whether the result is within the range can be generated by performing a bitwise AND of an inverse of the most significant bit of the shifted significand with (non-inverted values of) each of the next k bits of the shifted significand. A signal indicating whether the result is less than the range can be generated by performing an AND operation on an inverse of the most significant bit of the shifted significand with the inverse of a bitwise AND of the next k bits of the shifted significand. Of course, alternative sets of logic gates could be devised to give the same result, so this is just one example.

Also, the tininess detection circuitry 22 when performing after rounding tininess detection does not need to include any rounding increment adding circuitry 44, or normalising circuitry 38, 46 as in the example of FIG. 3, even for supporting AR tininess detection, which greatly speeds up the tininess detection and reduces the circuit area. The amount of circuit logic needed in the after rounding tininess rounding increment selection circuitry 52 to compute the after rounding tininess rounding increment ARI is relatively small because the range identifying circuitry 50 has identified a relatively narrow predetermined range for which the increment ARI is to be determined and so the number of possibilities are limited. Hence, this approach allows both types of tininess detection to be supported with relatively little circuit area and power cost.

Figure 5:
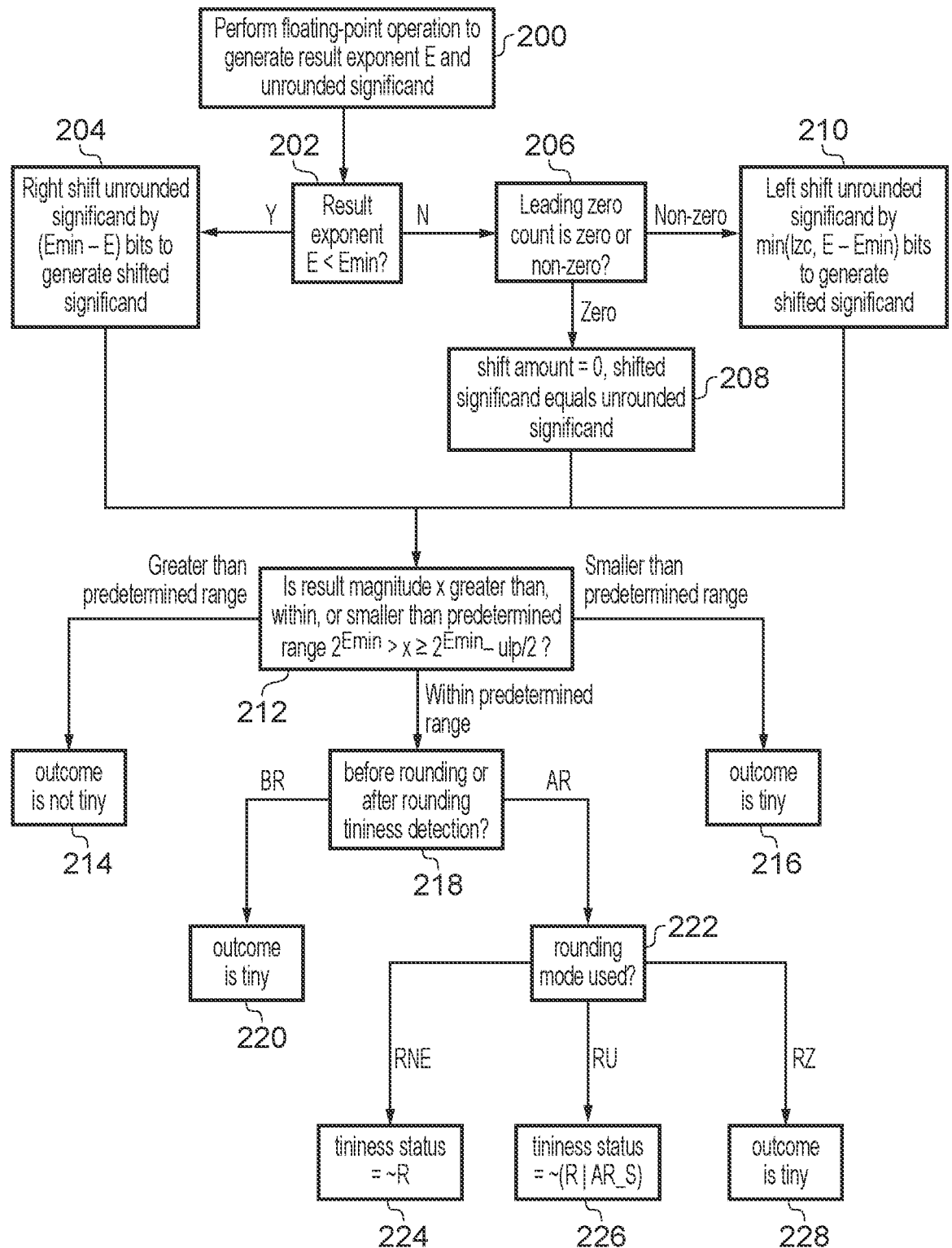
FIG. 5 is a flow diagram showing a method of performing both before rounding and after rounding tininess detection when non-injection rounding is used for a floating-point operation.

FIG. 5 is a flow diagram illustrating a method of detecting tininess in the example of FIG. 4. At step 200 the floating-point processing circuitry 20 performs the floating-point operation to generate a result exponent E and an unrounded significand. At step 202 the shift control circuitry 26 determines whether the result exponent E is less than the minimum exponent Emin which is the minimum normal exponent representable in the floating-point format being used. If the result exponent E is less than Emin then at step 204 the shift control circuitry 26 controls the shift circuitry 24 to perform a right shift of the unrounded significand by (Emin−E) bits to generate the shifted significand.

If the result exponent E is determined to be greater than or equal to Emin, then at step 206 the shift control circuitry 26 determines, based on a count of the number of leading zeros in the unrounded significand determined by leading zero count circuitry 28, whether the leading zero count is zero or non-zero. If the leading zero count is zero (i.e. the most significant bit of the shifted significand is 1), then at step 208 the shift amount is 0 and so the shift circuitry 24 simply outputs, as the shifted significand, the same value as the unrounded significand. If the leading zero count is non-zero then at step 210 the shift control circuitry 26 controls the shift circuitry 24 to perform a left shift of the unrounded significand by a number of bits corresponding to the minimum of the leading zero count and the difference E−Emin between the result exponent and the minimum exponent. The output of the left shift is the shifted significand.

Regardless of the variable number of bits used for the shift at steps 202 to 208 (the variable number of bits can represent no shift at all, a right shift or a left shift), at step 212 the range identifying circuitry 50 uses the upper k+1 bits of the shifted significand to determine whether the result magnitude x is greater than, within, or smaller than the predetermined range $2^{Emin}>x\geq 2^{Emin}-ulp/2$. If the most significant bit of the shifted significand is 1 then the result magnitude x is determined to be greater than the predetermined range and so at step 214 the multiplexer 56 outputs the tininess status value indicating that the outcome of the floating-point operation is not tiny. This is the case regardless of whether before rounding or after rounding tininess detection is performed.

If at step 212 the range identifying circuitry 50 determines that the most significant bit of the shifted significand is 0 and any one or more of the next k bits of the shifted significand are also 0, then the result magnitude x is determined to be smaller than the predetermined range and so at step 216 the multiplexer 56 outputs, as the tininess status, a value of 1 indicating that the outcome is tiny, for both before rounding and after rounding tininess detection.

If at step 212 the result magnitude x is determined to be within the predetermined range then at step 218 the multiplexer 54 determines whether before rounding or after rounding tininess detection is being performed and if before rounding tininess detection is performed then at step 220 the tininess status is set as 1 to indicate that the outcome is tiny, regardless of the rounding mode being used.

If at step 218 it is determined that after rounding tininess detection is performed then multiplexer 54 selects the output of not gate 53 which depend on the rounding increment (ARI) selected by after rounding tininess rounding increment selection circuitry 52, which in turn depends on the rounding mode. At step 222 it is determined which rounding mode is used. If the rounding mode is RNE then at step 224 the tininess status output for after rounding tininess detection corresponds to the inverse of the bit R which is two places below the least significant bit position that will be part of a truncated k-bit significand for the result value. If the rounding mode being used is RU then at step 226 the tininess status corresponds to the inverse of the logical OR of bit R with all lower bits ssss, so that the tininess status will be 1 to indicate that the outcome is tiny if all of the lower bits R, s are 0, and if any one of the bits R and s are 1 then the outcome will not be tiny (this reflects that for RU rounding the rounding value that would be added has 1s at all bit positions corresponding to R and ssss, so if any one of these bits is 1 this will cause an increment into the G bit position which is the lower bit of the rounded value when considering that a theoretical left shift by one place would be needed to ensure the leading bit is 1 for in-range values when doing AR tininess rounding, and so if the G bit position is incremented this will cause rounding to a non-tiny value $2^{Emin}$). If the rounding mode being used is RZ then at step 228 the outcome is tiny, as with RZ the rounding value to be added is 0 and so it is not possible to round a value in the predetermined range to a non-tiny value.

It will be appreciated that the flow diagram in FIG. 5 shows logical functions that can be performed to generate the tininess status, but the circuit logic does not necessarily need to perform the exact operation shown in FIG. 5 in the order shown, and it is acceptable for the tininess detection circuitry to perform the same operations in different orders, or to perform steps in parallel instead of sequentially. For example, in practice, the after rounding tininess rounding increment selected according to steps 222, 224, 226, 228 may be selected in parallel with the determination of whether the result magnitude x is within the predetermined range, regardless of whether before rounding or after rounding tininess detection is used, so that the consideration of the rounding mode does not need to start after determining that the result x is within the predetermined range. Similarly, the consideration of rounding mode does not need to be performed after determining whether before or after rounding tininess detection is performed—as shown in FIG. 4 the ARI can be selected each time (even if BR tininess detection is used), but multiplexer 54 will not select the output of ARI selection circuitry 52 if before rounding tininess detection is used. Also, it would be possible to provide a different arrangement of multiplexers to the one shown in FIG. 4. For example, it would be possible for a first set of multiplexers to select between before/after-rounding tininess values for each rounding mode (other than RZ rounding where the outcome is the same for both BR and AR tininess detection so no explicit selection based on the tininess detection type is needed) and a second multiplexer downstream of the first set of multiplexers to select, based on the rounding mode used, which of the outputs of the first set of multiplexers (or, in the case of RZ rounding, a default value of 1 to indicate that the outcome is tiny) is selected for output as the tininess status value to be used if the range determining circuitry 50 identifies that the shifted significand represents a result x within the predetermined range.

Combined Tininess Detection with Injection Rounding

Injection rounding adds a rounding injection to the computation before we obtain the unrounded significand. Because we have no access to the unrounded significand, we can't use the analysis given previously. In the below analysis, the values at bit positions G, R, ssss in the injection-rounded significand are labelled G', R', s's's's' to denote that the injection-rounding values could be different from the original values G, R, ssss that would have been generated for the unrounded significand had non-injection rounding been used.

Adding the injection alters the ranges of interest, so the range of interest becomes $2^{Emin}+ulp>x \geq 2^{Emin}$. For injection-rounded results greater than this range the BR and AR tininess status will be 0, and for injection-rounded results less than this range, the BR and AR tininess status will be 1.

For values in this range, there are two injections of interest here:

RNE: add a one at bit G

RU: add ones at G, R, and all of the s bits.

(RZ adds 0 and so the injection rounding will not change the result, so for both before rounding and after rounding tininess detection the tininess status will be 0 to indicate a non-tiny result, when the value is in the range $2^{Emin}+ulp>x \geq 2^{Emin}$).

For RNE rounding, adding the one at bit G doesn't change any of the lower-order bits, and in particular doesn't change R, so R'=R and s's's's'=ssss. However, the injection does alter the bit at position G, with a new BR rounding increment=BRI=G. Since we don't have G, we examine G'=G+1. BRI is then given by ~G'. The BR tininess status can be set equal to the BRI. That is, for RNE rounding and BR tininess, if G'=1 then this indicates that the unrounded value of G would have been 0 if injection rounding was not performed, so for the range $2^{Emin}+ulp>x \geq 2^{Emin}$ this implies that x would already have been greater than or equal to $2^{Emin}$ even if injection rounding had not been performed, and so the before rounding tininess status should be 0 to indicate a non-tiny result. If G'=0, then this indicates that the unrounded value of G would have been 1 if injection rounding was not performed, so for values in the range shown above, the injection-rounded significand reached $2^{Emin}$ only due to the addition of the injection rounding value, and so the result would have been tiny (less than $2^{Emin}$) if injection rounding had not been applied. Therefore, the before rounding tininess status is 1 if G'=0. Hence, for RNE rounding, setting BR tininess status to ~G' gives the correct outcome.

For RU rounding, adding the injection constant gives the sum sum[5:0]=L'G'R's's's'=LGRsss+11111

(in practice there may be more or less than 3 s bits, each with its corresponding 1 injection).

We can compute BRI for RU rounding by noting that the rounding increment is equivalent to any of G, R, or s bits being nonzero, which in turn is equivalent to ~&sum[4:0]. If G, R, s were all 0, then addition of the 11111 rounding value for RU rounding would cause G', R', s's's' to become all 1, and if the injection rounded value is in the range $2^{Emin}+ulp>x \geq 2^{Emin}$, this implies that there was no change to any bit more significant than G due to the injection rounding, so the result would have been $2^{Emin}$ if no injection rounding had been performed, and the before rounding tininess status should be 0. Hence, if an AND of all the bits G', R', s's's' in the injection-rounded significand after shifting is 1, then before rounding tininess status is 0 (not tiny). If any one of G', R', s's's' is 0, this implies that addition of the 11111 rounding value for injection rounding caused a carry to change the bit value at the L' bit position, so if the injection rounded value is in the range $2^{Emin}+ulp>x \geq 2^{Emin}$, the result would have been <$2^{Emin}$ if no injection rounding had been performed, and so the BR tininess status should be 1 to indicate a tiny result before rounding. Therefore, setting BR tininess status to ~&sum[4:0] (i.e., the inverse of a logical AND of G', R' and all s' bits of the shifted injection-rounded significand) gives the correct result for RU rounding.

For after rounding tininess detection, the relation to be used for setting AR tininess status for RNE and RU rounding can be proved as follows:

Assertion: If RNE and injection-rounded result is smallest normal, then AR_tiny=1<=>G'=R'=0.

Proof: First suppose the unrounded result x is normal (non-tiny):

$$\begin{array}{r} x \phantom{\,inj\,} \overline{1.00 \ldots \begin{array}{c} 0GRsss \\ 1 \end{array}} \\ inj \phantom{x} 1.00 \ldots 0G' \end{array}$$

Clearly, AR_tiny=0 and no carry into lsb, which implies G=0 and G'=1. Hence, if the injection-rounded result is the smallest normal and G'=1, the after-rounding tininess status is 0 as the result is not tiny after rounding.

Now, let's assume the unrounded result x is subnormal, while still generating the smallest normal as the injection-rounded result. We may also assume G=1; otherwise there is no increment:

$$\begin{array}{r} x \phantom{\,inj\,} \overline{0.11 \ldots \begin{array}{c} 10Rsss \\ 1 \end{array}} \\ inj \phantom{x} 0.11 \ldots 1G' \end{array}$$

If G'=1, then G=0, and the rounding injection didn't change the upper bits, so given that we know the injection-rounded result is actually the smallest normal (1.000 . . . 0G'R's's's'), it is not possible for G' to be 1 and the result to be tiny. Hence, if G'=1, AR_tiny=0.

This implies that for cases when the injection-rounded result is the smallest normal, for the AR_tiny status to be 1, G' must be 0.

In this case:

$$\begin{array}{r} x \quad 0.11 \ldots \overset{11Rsss}{1} \\ \hline inj \quad 1.00 \ldots 00 \end{array}$$

If G'=0, then G=1, and the pre-injection value was 0.11 . . . 11Rsss. Doing after-rounding tininess detection implies that we assume that the exponent is unbounded, so we do a (theoretical) left shift to normalise to 1.1 . . . 11Rsss and then apply rounding as in table 4, but now the bits at the least significant and guard positions are G and R instead of L and G—i.e. we can treat AR_L=G and AR_G=R for after rounding tininess detection rounding. From table 4, when rounding mode is RNE, we know that we round up if (AR_L & AR_G)|(AR_G & AR_S). As we have deduced that G=1 above, this simplifies to (1 & R)|(R & S) which is equivalent to R. As the injection does not change the value of R, R'=R. Therefore, If R'=AR_G=0, then there is no ARI (after-rounding tininess detection rounding increment), and so the result remains tiny after rounding.

If R'=AR_G=1, then ARI=1, so the result is not tiny.

This implies that, for RNE rounding, AR_tiny=1 if (and only if) G'=0 & R'=0.

Assertion: If RUP and rounded result is smallest normal, then AR_tiny=1<=>G'=0.

Proof: We can break the proof down by analysing the different possibilities for G=0, Rsss=0 separately as Cases 1 to 4 below.

Case 1: G=0, Rsss=0

If G, R, s were all zeroes, then rounding injection would cause G' R's's's' to be all ones. For values in the predetermined range where the injection rounded result is greater than or equal to $2^{Emin}$, this also implies that there was no change to L due to injection rounding (result was already equal to $2^{Emin}$ pre-rounding) and so tininess status is 0.

i.e AR_tiny=0 if G'=1 & (&sum[3:0])=1.

This also follows from observation that if BR_tiny=0, AR_tiny is always 0.

Case 2: G=0 & Rsss !=0

In case 2, if any of Rsss is non-zero, adding 1111 will mean that at least one of bits R's's's' is 0 (R's's's' can only be 1111 if Rsss was 0). Therefore, for case 2, &sum[3:0]=0.

For a result in this range with any of G, R, ssss non-zero, AR_tiny would be 0 only if ARI tininess increment causes an overflow. This can be seen from the following reasoning. If any of G, R, sss is non-zero, the addition of 11111 in the injection rounding would cause a carry into the L bit of the injection-rounded result, so in this case the original unrounded result (in the absence of injection rounding) would have to be subnormal for the injection-rounded value to fall in the predetermined range $2^{Emin}+ulp>x\geq 2^{Emin}$.

As the pre-injection-rounded value would be subnormal and so have the form 0.1111 . . . , if AR tininess detection rounding was applied to the pre-injection rounded subnormal result, a theoretical normalization (left shift by one bit) would be performed to provide a most significant bit of 1, and then for RU rounding 1s would be added at AR_G, AR_R and AR_s, i.e. at bits R, s, s, s from the unrounded result:

$$\begin{array}{r} x \quad 1.11 \ldots \overset{1G|Rsss}{1111} \\ \hline inj \quad 1.11 \ldots 1G'' \end{array}$$

(note that G", the value at the G position after the (theoretical) AR rounding addition, is not the same as G' shown above, which is the value at the G position formed after regular injection rounding).

If there is no overflow caused by the AR rounding addition, the most significant '1' after the AR tininess rounding increment will remain at a bit position that corresponds to a power of 2 less than $2^{Emin}$, and the result after rounding will remain tiny.

Therefore, when the injection-rounded value is in the predetermined range, and any of G, R, sss are non-zero, AR_tiny can only be 0 if the ARI tininess increment causes an overflow.

For ARI to cause an overflow (after 1 bit left shift), AR_L (G) bit has to be set (otherwise a carry caused by a rounding increment will not propagate beyond bit G). Therefore, when G=0 and result lies in the predetermined range, AR_tiny is always 1.

Due to the injection rounding, we only have G' available to analyse, not G. We can deduce what the value of G' is for G=0 & Rsss !=0. Since at least one of R or s bits are one, there would be a carry-in to G bit position after injection rounding. G'=G+1+cin (the 1 coming from the injection rounding constant 11111 for RU rounding, and the cin coming from the addition of 1 at all of the Rsss bit positions). Since G=0 and cin=1, G'=0+1+1=0.

Hence, AR_tiny=1 if G'=0 & (&sum[3:0])=0.

Case 3: G=1 & Rsss=0

For a result in the predetermined range with any of G, R, ssss non-zero, AR_tiny would be 0 only if ARI tininess increment causes an overflow (for the same reason as given for Case 2).

After 1 bit left shift (normalization), since R&s bits are all zeros, there cannot be a rounding increment into bit G", so there is no possibility of overflow, i.e. ARI=0 & AR_tiny=1.

We can deduce what the value of G' will be after injection rounding, in a case where G=1 and Rsss=0. Since R|S is zero, (&sum[3:0])=1 & there is no carry-in to G bit position during rounding injection.

This implies that G'=0 in case 3, since G'=G+1+cin=1+1+0=0.

Hence, AR_tiny=1 when G'=0 & (&sum[3:0])=1.

Case 4: G=1 & Rsss !=0

Since R|S is non-zero, (&sum[3:0])=0 for the same reason as explained for case 2.

For a result in this range, again AR_tiny would be 0 only if ARI tininess increment causes an overflow. After 1 bit left shift (normalization to treat exponent as unbounded), since R & s bits are not all zeros, there will be a rounding increment. i.e. ARI=1. Since G=1, this increment can propagate to the result and will cause an overflow making AR_tiny=0.

We now deduce what the value of G' is in case 4. For case 4, G'=1 after rounding injection (since G'=G+1+cin=1+1+1=1).

i.e AR_tiny=0 when G'=1 & (&sum[3:0])=0.

Looking at all four cases, we see that if result lies in the predetermined range, and rounding mode is RU, AR_tiny=1 iff G'=0.

Putting this all together, when injection rounding is used, the before rounding increment (BRI) and after rounding increment (ARI) used to determine tininess status for values in the predetermined range are as set out in Table 8:

TABLE 8

| Rounding mode | BRI | ARI |
|---|---|---|
| RNE | ~G' | G'\|R' |
| RU | ~&sum[4:0] | G' |
| RZ | 0 | 1 |

The tests to apply for determining, based on the shifted injection-rounded result, whether the result magnitude is within the predetermined range, and for determining the tininess status are set out in Table 9:

TABLE 9

| range | Shifted unrounded significand | BR_tiny | AR_tiny |
|---|---|---|---|
| $x \geq 2^{Emin} +$ ulp | 1 followed by at least one of the following k-1 bits set to 1 (or result exponent E > Emin) | 0 | 0 |
| $2^{Emin} + $ ulp $> x \geq 2^{Emin}$ | 1 followed by k-1 zeroes | BRI | ~ARI |
| $2^{Emin} > x$ | 0 followed by anything | 1 | 1 |

Figure 6:
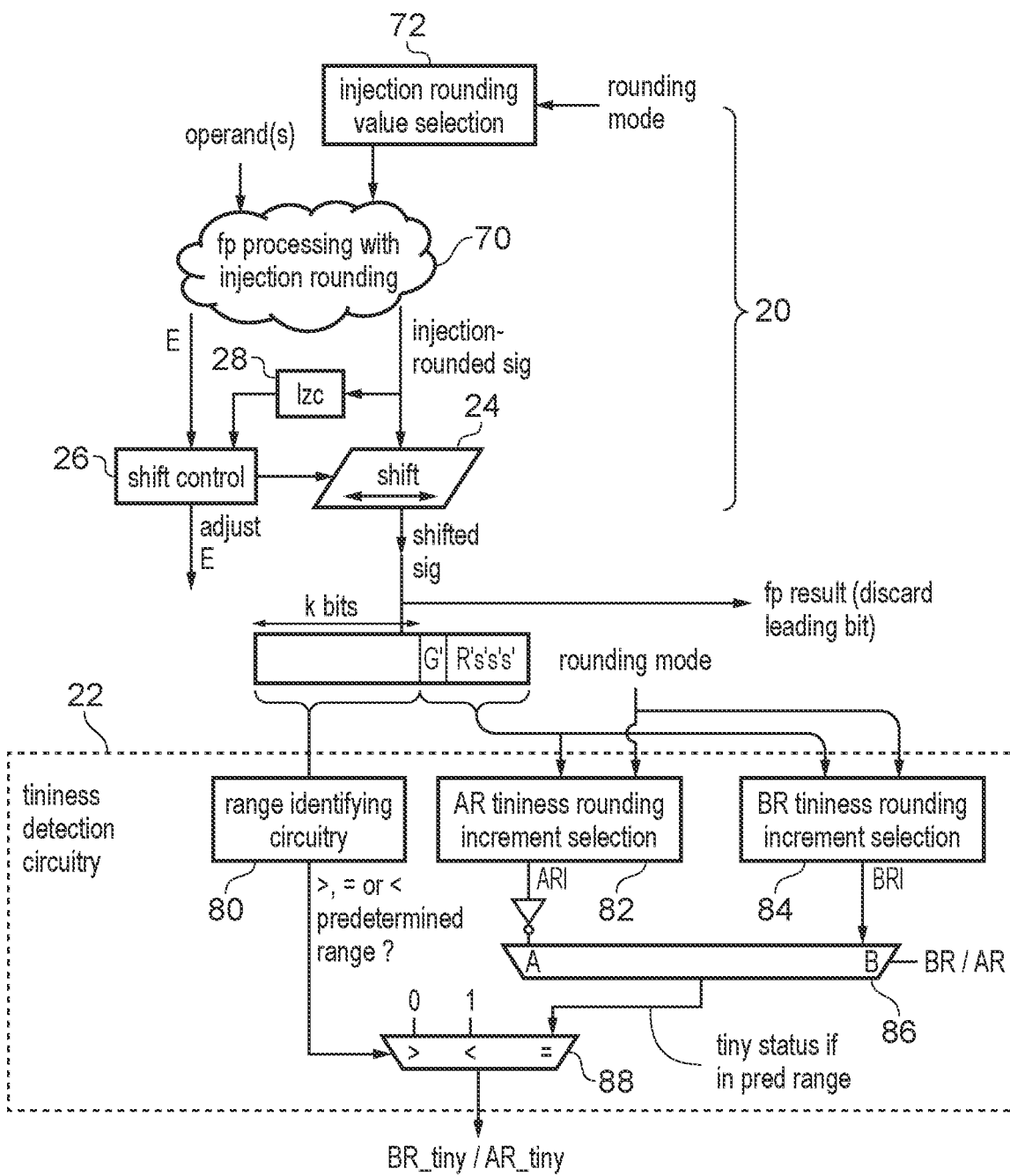
FIG. 6 shows another example of combined tininess detection circuitry capable of performing both before round and after rounding tininess detection, where the floating-point processing circuitry performs injection rounding.

Putting this into practice, FIG. 6 illustrates the circuit logic for combined before rounding and after rounding tininess detection circuitry 22 when injection rounding is used. The floating-point processing circuitry 20 in this example includes floating-point processing operation circuitry 70 which performs both the processing operation itself and the addition of an injection rounding value which is selected by injection rounding value selection circuitry 72 according to the rounding mode being used. The injection rounding value is 0 if RZ rounding is being performed, corresponds to a bit of 1 at the bit position one place below the lower bit of the k-bit significand after truncation if RNE rounding is being used, or corresponds to a value having bits of 1 at all the bit positions lower than the point at which the significand will be truncated if RU rounding is being used. The floating-point processing operation could be an addition or multiplication for example, which may involve adding two or more operands, or a certain number of partial multiplication products, and so the addition of the injection rounding value could be folded into the same addition or additions already being performed as part of the floating-point processing operation itself, so that the significand output by the processing logic 70 is an injection-rounded significand which already factors in the rounding and so in this example the floating-point processing circuitry 20 does not need the rounding value selection circuitry 30 and adder 32 to examine bits of the result significand and add a further rounding increment. Nevertheless, the floating-point processing circuitry 20 includes the shift circuitry 24, shift control circuitry 26 and leading zero count circuitry 28 to perform the normalising shift to ensure that if the result exponent E is less than the minimum normal exponent or the leading zero count is non-zero then a right or left shift is applied to ensure that the significand is adjusted to be in either a normal format with a leading 1 or a subnormal format with a leading 0 which corresponds to an exponent having the minimum value supported for normal floating-point numbers in the floating-point format being used. The top k bits of the shifted injection-rounded significand can be truncated and output as the overall floating-point result for the floating-point operation without any further rounding being needed. The leading bit is discarded to produce the k−1 bit stored fraction of the result floating-point value.

Meanwhile, the tininess detection circuitry receives the full injection-rounded significand (without truncation) and comprises range identifying circuitry 80, after rounding tininess rounding increment selection circuitry 82, before ending tininess rounding increment selection circuitry 84 and multiplexers 86, 88.

The range identifying circuitry 80 in the injection rounding example of FIG. 6 is different to the range identifying circuitry 50 of FIG. 4 in that the predetermined range of interest is different, but in a similar manner the range identifying circuitry identifies whether the shifted significand output by shifter 24 is greater than, within or less than a predetermined range. In this case, the range of interest is $2^{Emin}+$ulp$>x\geq 2^{Emin}$. A signal indicating whether the result magnitude is greater than, within or less than the predetermined range is output to the multiplexer 88 which will select the final value for the tininess status.

Meanwhile, the after rounding tininess rounding increment selection circuitry 82 and the before rounding tininess rounding increment selection circuitry 84 make rounding-mode-specific selections of rounding increments, depending on analysis of the bits G', R' and lower bits s' of the shifted significand which are at bit positions which would be discarded when the shifted significand is truncated to generate the floating-point result value. The functions used to select the tininess rounding increment differ for before rounding and after rounding tininess rounding increment selection as shown in Table 9 above and discussed further in the flow diagram of FIG. 7 below. The before rounding tininess rounding increment (BRI) selected by circuitry 84 is output to one input of multiplexer 86 and an inverted version of the after rounding tininess rounding increment (ARI) is output to the other input of multiplexer 86. The multiplexer 86 selects BRI if before rounding tininess detection is to be performed for the current operation and selects the inverted version of ARI when after rounding tininess detection is to be performed.

The final multiplexer 88 outputs a value of 0 as the tininess status to indicate a not-tiny result when the range identifying circuitry 80 identifies that the result magnitude is greater than the predetermined range, and outputs a tininess status of 1 indicating a tiny result when the result magnitude is determined to be less than the predetermined range. This is the case for both before rounding and after rounding tininess detection. On the other hand, within the predetermined range, the output of multiplexer 86 is output as the tininess status.

Figure 7:
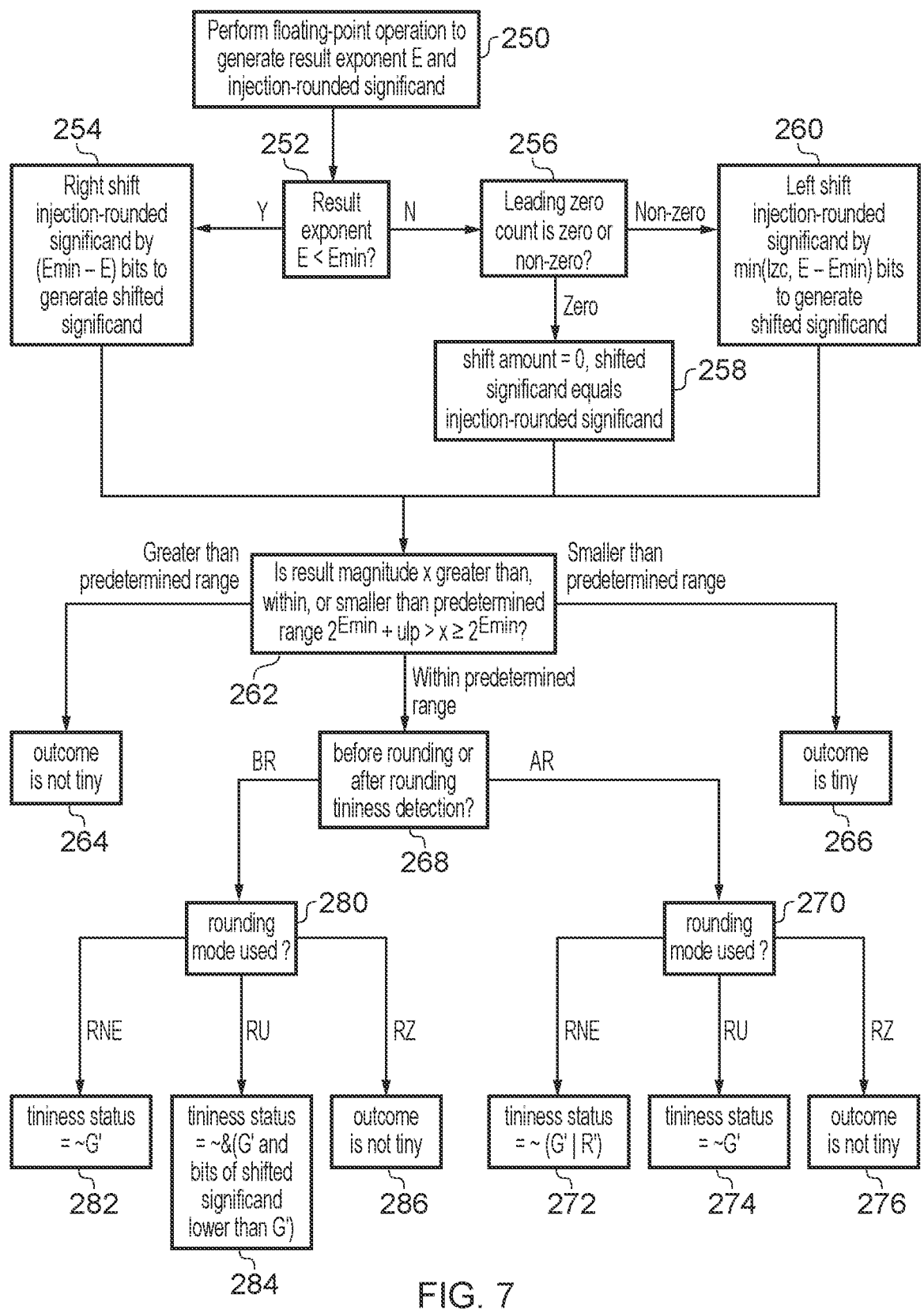
FIG. 7 is a flow diagram showing a method of performing before rounding tininess detection and after rounding tininess detection in a case where injection rounding is used.

FIG. 7 is a flow diagram illustrating a method for performing tininess detection in a case where injection rounding is used. Again, it will be appreciated that this shows one possible ordering for the steps but it can be possible to perform some of these steps in parallel with each other or in a different order.

At step 250 the floating-point processing circuitry 20 performs the floating-point operation to generate a result exponent E and an injection-rounded significand, where addition of an injection rounding value has been performed as part of the floating-point operation itself. This can be done according to any standard injection rounding techniques.

Steps 252, 254, 256, 258, 260 are the same as the corresponding steps 202, 204, 206, 208, 210 of FIG. 5, which selectively apply a right or left shift to normalise the injection-rounding significand or place it in a proper sub-normal form, depending on the comparison of the result exponent E with the minimum normal exponent Emin supported in the floating-point format being used and on the leading zero count of the injection-rounding significand. The result of these steps is referred to as the shifted significand (although it is recognised that at step 258 the shift amount may be 0 and in that case the shifted significand simply equals the injection-rounded significand).

At step 262 the range identifying circuitry 80 identifies based on the top k bits of the shifted significand whether the result magnitude x is greater than, within or smaller than the predetermined range $2^{Emin}+ulp > x \geq 2^{Emin}$.

If the most significant bit of the shifted significand is 1 and any of the next k−1 bits of the shifted significand is non-zero, then the result magnitude x is greater than the predetermined range, and at step 264 the outcome of the floating-point operation is determined to be not tiny, and so for both the before and after rounding tininess detection the tininess status is 0.

If at step 262 the range identifying circuitry 80 identifies that the most significant bit of the shifted significand is 0, then the result magnitude x is smaller than the predetermined range and so for both the before rounding and after rounding tininess detection the tininess status is set to 1 to indicate that the outcome is tiny.

If at step 262 the range identifying circuitry 80 identifies that the most significant bit of the shifted significand is 1 and this is followed by k−1 zeros, then the result magnitude x is determined to be within the predetermined range, and so in this case the tininess status depends on the analysis made by the before rounding and after rounding tininess rounding increment selection circuitry 84, 82. At step 268 the multiplexer 86 determines whether before rounding or after rounding tininess detection is being performed.

If after rounding tininess detection is being performed then at step 270 the tininess status depends on the rounding mode being used. If the rounding mode is RNE then at step 272 the after rounding tininess rounding increment selection circuitry 82 determines the after rounding tininess rounding increment ARI as the logical OR of G' and R', which are the two bits at the most significant bit positions within the portion that will be discarded when the significand is truncated to form the floating-point result, and the tininess status is set according to the inverse of this ARI, so the outcome is tiny if both G' and R' are 0 and the outcome is not tiny if either G' or R' is 1.

If the rounding mode to be used is RU then at step 274 for after rounding tininess detection ARI is equal to bit G' which is one place below the point at which the shifted significand is truncated to form the floating-point result, and the tininess status is equal to the inverse of G' so that if bit G' is 1 the outcome is not tiny and if G' is 0 then the outcome is tiny.

If the rounding mode is determined at step 270 to be RZ rounding, at step 276 the outcome is determined to be not tiny and so multiplexer 88 will output a value of 0.

On the other hand, if at step 268 it is determined that before rounding tininess detection is to be used, then at step 280 the tininess status depends on the rounding mode determined to be used. At step 282, if RNE rounding is being used then the tininess status corresponds to the inverse of the bit G' which is the most significant bit of the portion discarded in truncation. If the rounding mode being used is RU rounding then at step 284 the tininess status corresponds to the inverse of the result of combining bit G' and all bits of the shifted significand lower than G' in a logical bitwise AND operation. This means that if all of the bits within the portion discarded in truncation are 1 then the tininess status is 0 to indicate that the outcome is not tiny, while if any of the lower bits G', R' and s' are 0 then the outcome will be indicated as being tiny.

On the other hand, at step 286 if the rounding mode being used is RZ then it is determined that the outcome is not tiny.

Hence, with this approach even when injection rounding is being used, it is still possible to provide combined tininess detection circuitry 22 which, for both before rounding and after rounding tininess detection, computes the tininess status with a relatively simple set of Boolean logic by analysing the bits of a shifted significand, without requiring any rounding increment addition beyond the addition already being performed as part of the floating-point operation 70 itself for injection rounding. This provides fast tininess detection capable of performing both types of tininess detection in a shared data path.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
floating-point processing circuitry to perform a floating-point operation with rounding to generate a floating-point result value; and
tininess detection circuitry to detect a tininess status indicating whether an outcome of the floating-point operation with rounding is tiny, where a tiny outcome corresponds to a non-zero number with a magnitude smaller than a minimum non-zero magnitude representable as a normal floating-point number in a floating-point format to be used for the floating-point result value;
the tininess detection circuitry comprising hardware circuit logic configured to support both before rounding tininess detection and after rounding tininess detection for detecting the tininess status;
in which the tininess detection circuitry is configured to select, based on a software-programmable control parameter, whether to detect the tininess status according to the before rounding tininess detection or the after rounding tininess detection.

2. The apparatus according to claim 1, in which the tininess detection circuitry comprises a shared datapath used for both the before rounding tininess detection and the after rounding tininess detection.

3. The apparatus according to claim 2, in which the tininess detection circuitry comprises selection circuitry to select, based on whether the tininess detection circuitry is to perform the before rounding tininess detection or the after rounding tininess detection, an intermediate value, other than the tininess status itself, for use in determining the tininess status.

4. The apparatus according to claim 1, in which the floating-point processing circuitry is configured to perform injection rounding to generate an injection-rounded significand for the floating-point result value; and
the tininess detection circuitry is configured to detect the tininess status based on the injection-rounded significand, for both the before rounding tininess detection and the after rounding tininess detection.

5. The apparatus according to claim 1, in which the floating-point processing circuitry is configured to generate an unrounded significand;
the floating-point processing circuitry comprises non-injection rounding circuitry to round the unrounded significand to generate a rounded result significand for the floating-point result value; and
the tininess detection circuitry is configured to detect the tininess status based on the unrounded significand, for both the before rounding tininess detection and the after rounding tininess detection.

6. The apparatus according to claim 1, in which the floating-point processing circuitry is configured to perform the rounding by selectively performing a rounding addition to generate a rounded result significand for the floating-point result value; and
the tininess detection circuitry is configured to perform the after rounding tininess detection without performing any further rounding addition other than the rounding addition performed by the floating-point processing circuitry to generate the rounded result significand for the floating-point result value.

7. The apparatus according to claim 1, in which in the floating-point operation with rounding, the floating-point processing circuitry is configured to generate a result exponent, and a significand;
the apparatus comprises shifting circuitry to perform a shift on the significand by a variable number of bits, to generate a shifted significand; and
the tininess detection circuitry is configured to detect the tininess status based on the shifted significand generated by the shifting circuitry, for both the before rounding tininess detection and the after rounding tininess detection.

8. The apparatus according to claim 7, in which:
the apparatus comprises shift control circuitry to select the variable number of bits for the shift;
when the result exponent is less than a minimum exponent supported by the floating-point format for non-zero normal floating-point numbers, the shift is a right shift by Emin-E bits, where Emin is the minimum exponent and E is the result exponent;
when the result exponent is greater than or equal to the minimum exponent and the most significant bit of the significand is one, the variable number of bits is zero; and
when the result exponent is greater than or equal to the minimum exponent and the most significant bit of the significand is zero, the shift is a left shift by a number of bits corresponding to a minimum of lzc and (E-Emin), where lzc is a number of leading zeroes in the significand.

9. The apparatus according to claim 7, in which the tininess detection circuitry comprises range identifying circuitry to identify whether a result magnitude represented by the result exponent and the significand is within a predetermined range for which the before rounding tininess detection and the after rounding tininess detection are capable of providing different outcomes for the tininess status for at least one rounding mode.

10. The apparatus according to claim 9, in which the range identifying circuitry is configured to identify, based on the shifted significand, whether the result magnitude is within the predetermined range.

11. The apparatus according to claim 9, in which:
when the result magnitude is determined by the range identifying circuitry to be within the predetermined range, at least for the after rounding tininess detection and for at least one rounding mode, the tininess detection circuitry is configured to set the tininess status based on one or more lower bits of the shifted significand which are at bit positions which would be discarded if the shifted significand was truncated to fit within the floating-point format to be used for the floating-point result; and
when the result magnitude is determined by the range identifying circuitry to be outside the predetermined range, the tininess detection circuitry is configured to set the tininess status independent of said one or more lower bits of the shifted significand.

12. The apparatus according to claim 9, in which:
when the result magnitude is determined by the range identifying circuitry to be greater the predetermined range, for both the before rounding tininess detection and the after rounding tininess detection, the tininess detection circuitry is configured to set the tininess status to indicate that the outcome of the floating-point operation with rounding is not tiny;
when the result magnitude is determined by the range identifying circuitry to be smaller than the predetermined range, for both the before rounding tininess detection and the after rounding tininess detection, the tininess detection circuitry is configured to set the tininess status to indicate that the outcome of the floating-point operation with rounding is tiny.

13. The apparatus according to claim 12, in which the floating-point processing circuitry is configured to generate the unrounded significand; and
the range identifying circuitry is configured to determine that the result magnitude is within the predetermined range when the result magnitude X satisfies the bounds $2^{Emin} > x \geq 2^{Emin} - ulp/2$, where ulp is a minimum positive non-zero number representable as a subnormal number in the floating-point format to be used for the floating-point result value.

14. The apparatus according to claim 9, in which the floating-point processing circuitry is configured to generate the unrounded significand; and
when the result magnitude is determined by the range identifying circuitry to be within the predetermined range, for the before rounding tininess detection, the tininess detection circuitry is configured to set the tininess status to indicate that the outcome of the floating-point operation with rounding is tiny.

15. The apparatus according to claim 9, in which the floating-point processing circuitry is configured to perform injection rounding to generate the injection-rounded significand; and
the range identifying circuitry is configured to determine that the result magnitude is within the predetermined range when the result magnitude X satisfies the bounds $2^{Emin} + ulp > x \geq 2^{Emin}$, where ulp is a minimum positive non-zero number representable as a subnormal number in the floating-point format to be used for the floating-point result value.

16. The apparatus according to claim 9, in which the floating-point processing circuitry is configured to perform injection rounding to generate the injection-rounded significand; and
when the result magnitude is within the predetermined range, for at least one rounding mode, for both the before rounding tininess detection and the after rounding tininess detection the tininess detection circuitry is configured to set the tininess status based on one or more lower bits of the shifted significand which are at bit positions which would be discarded if the shifted significand was truncated to fit within the floating-point format to be used for the floating-point result value.

17. A non-transitory computer-readable medium to store computer-readable code for fabrication of the apparatus of claim 1.

18. A data processing method comprising:
performing a floating-point operation with rounding to generate a floating-point result value; and
detecting a tininess status indicating whether an outcome of the floating-point operation with rounding is tiny, where a tiny outcome corresponds to a non-zero number with a magnitude smaller than a minimum non-zero magnitude representable as a normal floating-point number in a floating-point format to be used for the floating-point result value; in which:
the tininess status is detected using tininess detection circuitry comprising hardware circuit logic configured to support both before rounding tininess detection and after rounding tininess detection for detecting the tininess status, the method further comprising:
selecting, based on a software-programmable control parameter, whether to detect the tininess status according to the before rounding tininess detection or the after rounding tininess detection.

19. An apparatus comprising:
floating-point processing circuitry to perform a floating-point operation with injection rounding to generate an injection-rounded significand for a floating-point result value; and
tininess detection circuitry to detect a tininess status indicating whether an outcome of the floating-point operation with injection rounding is tiny, where a tiny outcome corresponds to a non-zero number with a magnitude smaller than a minimum non-zero magnitude representable as a normal floating-point number in a floating-point format to be used for the floating-point result value; in which:
the tininess detection circuitry is configured to detect the tininess status based on the injection-rounded significand generated by the floating-point processing circuitry.

* * * * *